United States Patent [19]

Maeda et al.

[11] Patent Number: 5,606,630
[45] Date of Patent: Feb. 25, 1997

[54] PHOTOGRAPHED IMAGE REPRODUCING APPARATUS

[75] Inventors: Yukari Maeda, Osaka; Hiroaki Kubo, Kyoto; Toshiyuki Tanaka, Amagasaki, all of Japan

[73] Assignee: Minolta Camera Kabushiki Kaisha, Osaka, Japan

[21] Appl. No.: 174,354

[22] Filed: Dec. 28, 1993

[30] Foreign Application Priority Data

Dec. 28, 1992 [JP] Japan ................................. 4-349443
May 25, 1993 [JP] Japan ................................. 5-122879

[51] Int. Cl.⁶ .................................................. G03B 35/00
[52] U.S. Cl. ........................... 382/254; 382/167; 358/518; 396/319
[58] Field of Search ............................. 382/1, 22, 41, 382/17, 54, 55, 173, 162, 164, 167, 254; 358/518; 364/526; 354/110

[56] References Cited

U.S. PATENT DOCUMENTS

| | | | |
|---|---|---|---|
| 4,364,084 | 12/1982 | Akimoto et al. | 358/76 |
| 4,482,924 | 11/1984 | Brownstein | 358/302 |
| 4,977,521 | 12/1990 | Kaplan | 364/526 |
| 5,140,649 | 8/1992 | Kageyama | 382/167 |
| 5,157,506 | 10/1992 | Hannah | 364/526 |
| 5,266,805 | 11/1993 | Edgar | 382/54 |
| 5,344,730 | 9/1994 | Kitamoto | 354/106 |

FOREIGN PATENT DOCUMENTS

| | | | |
|---|---|---|---|
| 63-2517B2 | 1/1988 | Japan | H04N 1/40 |
| 63-38154 | 7/1988 | Japan | H04N 1/46 |

*Primary Examiner*—Leo Boudreau
*Assistant Examiner*—Christopher Kelley
*Attorney, Agent, or Firm*—Burns, Doane, Swecker & Mathis, LLP

[57] ABSTRACT

An image reproducing apparatus is adapted for reproducing a photographed image recorded on a film, the film having photographic information about the photographed image. The apparatus includes a reproducer for reproducing the photographed image recorded on the film, a reader for reading the photographic information from the film, a corrector for correcting the quality of the photographed image, a setter for setting a correction for the corrector based on the photographic information, and a controller for controlling the corrector to reproduce the photographed image in accordance with the set correction.

5 Claims, 26 Drawing Sheets

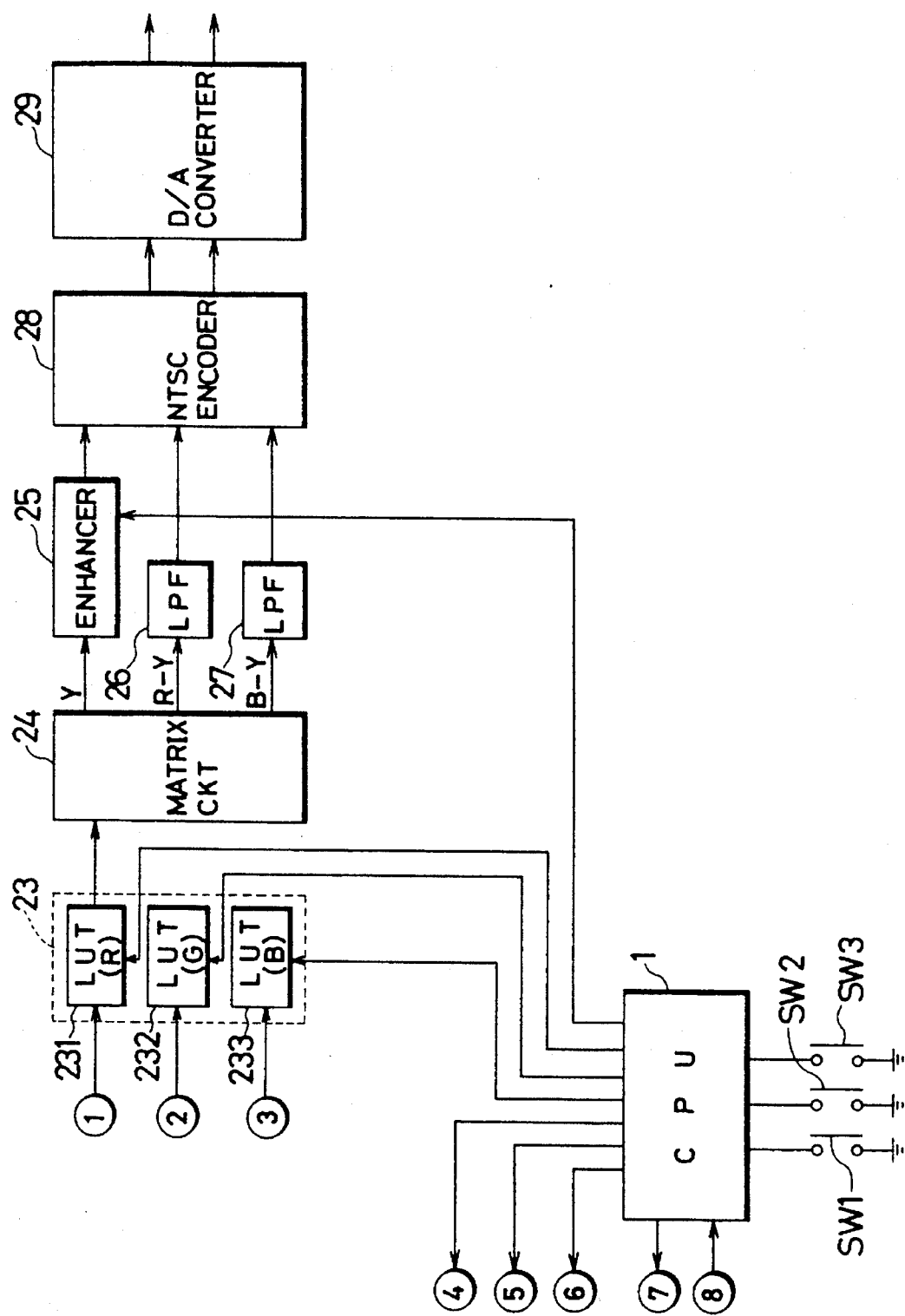

FIG. 15A
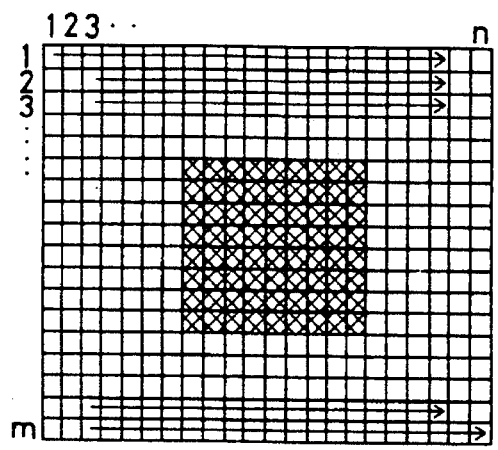
FIG. 15B   FIG. 15C
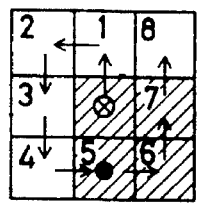 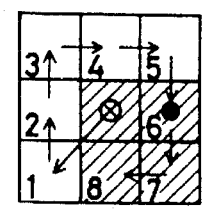
⊗ TRACKING POINT
● NEXT TRACKING POINT
FIG. 16
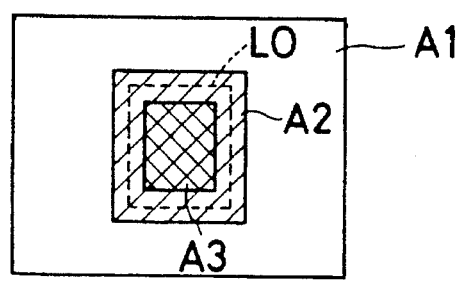

PHOTOGRAPHED IMAGE REPRODUCING APPARATUS

BACKGROUND OF THE INVENTION AND RELATED ART STATEMENT

The present invention relates to a photographed image reproducing apparatus which picks up an image photographed in each frame of a film by a photoelectric conversion device and reproduces/displays the picked up image on a television (TV) monitor.

There have been known photographed image reproducing apparatuses which pick up an image photographed in each frame of a film (hereinafter referred to merely as a photographed image) by an image pick-up device such as a charge coupled device (CCD) and reproduce the picked up image on a TV monitor or like display apparatus. In the apparatuses of this type, a gradation characteristic, an outline characteristic, and the like are adjustable so as to adjust the quality of the image reproduced on the TV monitor.

For instance, Japanese Unexamined Patent Publication No. 62-161143 discloses the following photographed image reproducing apparatus. A plurality of gradation correction tables and color correction tables corresponding to a plurality of different types of pictures are stored in advance. A picture of the picked up image is classified based on information including average, maximum and minimum transmission densities and the number of colors such as red, blue, and green. Gradation and color corrections are applied to the picked up image using the gradation and color correction tables corresponding to the classified picture.

Further, Japanese Examined Patent Publication No. 63-38154 discloses the following photographed image reproducing apparatus which displays a picked up image obtained by scanning a photographed image on a TV monitor. Gradation and color information is calculated from the picked up image. The calculation values are compared with predetermined reference values to calculate a scanning condition under which the photographed image is scanned so as to exhibit proper gradation and colors in a reproduced image.

The purpose of the photographing operation differs, which leads to different types of pictures such as a landscape picture, a collective picture including images of many people, a portrait picture and a macrophotographed picture. The quality of an image to be reproduced differs depending on the photographing purpose.

For example, in the case of the macrophotographed picture, it is preferable to emphasize a main subject such as a flower and an insect and to reproduce the main subject image clearly. In the case of the portrait picture, it is preferable to emphasize an image of a person relative to a background image to such an extent as not to damage harmony with the background image and to reproduce the portrait picture such that the main subject image stands out of the background image.

It is well known that characteristics of the photographed image differs depending upon a light source. For example, an image photographed under the tungsten or fluorescent light tends to be unclear compared to the one photographed using the sunlight during the day as a light source. Likewise, an image photographing using the sunlight on a cloudy day is less clear than the one photographed on a fine day.

In the case of a flash firing photographing operation, the amount of light illuminating a subject differs depending upon a distance between the camera and the subject, which leads in some cases to an improper luminance balance between a background image and a subject image in a photographed image. For instance, when a photographed image obtained by photographing a subject standing close to the camera with the assist of flash light is reproduced on a TV monitor, the reproduced subject image looks unnatural, looking particularly whitish relative to the background image.

The reproducing apparatuses disclosed in the above-mentioned references set the contents of the gradation and color corrections based on the information obtained by picking up the photographed image. These apparatuses do not set contents of an image quality correction such as a gradation correction based on data concerning photographing operations recorded in correspondence with respective frames, the data including the focusing accuracy, magnification, light source and exposure level.

With these apparatuses, it may be possible to correct the overall image quality of the reproduced image by correcting the gradation and colors of the photographed image itself, but it is difficult to obtain a proper image quality in consideration of the photographed content, e.g., the time when a landscape picture is taken.

Further, since an image having an extremely large luminance difference is reproduced with an unnatural luminance balance, it is desirable to prepare different gradation characteristics for images in high and low luminance regions and to apply to each region a gradation correction corresponding to the luminance. The above-mentioned references disclose no art of dividing the photographed image into a high luminance region and other region, and correcting the image in each region using a gradation characteristic corresponding to the luminance of the region. Thus, with the apparatuses disclosed therein, it is also difficult to correct a photographed image having a large luminance difference and to reproduce an image having a natural luminance balance.

SUMMARY OF THE INVENTION

Accordingly, it is an object of the present invention to provide a photographed image reproducing apparatus which has overcome the problems residing in prior art.

Also, it is another object of the present invention to provide a photographed image reproducing apparatus which makes it possible to apply an image quality correction according to a photographed content to a picked-up image of a photographed image to assure image reproduction in accordance with the photographed content and photographing condition.

Further, it is another object of the present invention to provide a photographed image reproducing apparatus which makes it possible to apply a gradation correction to a photographed image having a large luminance difference so as to make the luminance difference smaller to thereby reproduce an image in accordance with the photographed content and photographing condition.

Accordingly, an image reproducing apparatus of the present invention is adapted for reproducing a photographed image recorded on a film, the film having photographic information about the photographed image. The apparatus comprises: reproducing means for reproducing the photographed image recorded on the film; reading means for reading the photographic information from the film; correcting means for correcting the quality of the photographed image; setting means for setting a correction for the photographed image based on the photographic information; and control means for controlling the correcting means to reproduce the photographed image in accordance with the set correction.

It may be appreciated to provide the setting means with means for setting a gradation correction for the photographed image in accordance with the read photographic information; and to provide the correcting means with means for correcting the gradation of the photographed image in accordance with the gradation correction.

Also, it may be appreciated to provide the setting means with means for setting an outline correction for the photographed image in accordance with the read photographic information; and to provide the correcting means with means for correcting the outline of the photographed image in accordance with the outline correction.

Further, it may be appreciated to provide the setting means with means for setting gradation and outline corrections for the photographed image in accordance with the read photographic information; and to provide the correcting means with means for correcting the gradation and outline of the photographed image in accordance with the gradation and outline corrections.

Further, it may be appreciated to provide the setting means with means for setting a plurality of gradation characteristics for the photographed image in accordance with the read photographic information; and to provide the correcting means with means for correcting the gradation of the photographed image in accordance with the set plurality of gradation characteristics.

The photographic information may be appreciated to be recorded on the film. Also, the photographic information may be appreciated to be indicative of the subject of the photographed image being photographed in a back light condition.

It may be preferable to convert the photographed image recorded on the film to a video signal by converting means.

Furthermore, it may be appreciated that the setting means sets a gradation characteristic for each of a plurality of regions of the photographed image, and the correcting means corrects the gradation of each region in accordance with the set gradation characteristic.

Furthermore, it may be appreciated to further provide dividing means for dividing the photographed image into a plurality of regions based on the photographic information, and to provide the setting means with means for setting a correction for each of the plurality of regions; and to provide the correcting means with means for correcting each region in accordance with the set correction.

Also, it may be preferable that the photographic information has illuminance information about the photographed image, and the dividing means divides the photographed image based on the illuminance information.

Also, it may be preferable that the setting means includes means for setting a gradation characteristic for each of the plurality of regions, and the correcting means includes means for correcting the gradation of each region in accordance with the set gradation characteristic.

Furthermore, it may be appreciated that the film has a plurality of kinds of photographic information about the photographed image; the reading means includes means for reading the plurality of kinds of photographic information from the film; and the apparatus is further provided with determining means for determining the priority order of the plurality of kinds of photographic information; and the setting means includes means for setting a correction for the photographed image based on the priority order determined by the determining means.

Furthermore, it may be preferable that the plurality of kinds of photographic information may be preferable to have focus information as to whether the subject of the photographed image is in focus or out of focus; and the correcting means includes means for correcting the outline of the photographed image, the outline correcting means having a plurality of correction levels; and the determining means places the focus information on the top rank of the priority order; and the setting means sets a higher level outline correction when the subject of the photographed image is out of focus.

Furthermore, it may be appreciated that the film has a plurality of kinds of photographic information about the photographed image; the reproducing means has a plurality of reproduction manners corresponding to the plurality of kinds of photographic information, respectively; and the apparatus is provided further with reading means for reading the plurality of kinds of photographic information from the film; determining means for determining the priority order of the plurality of kinds of photographic information; and the setting means includes means for setting the reproduction manner corresponding to the kind of photographic information ranked on the top priority; and the control means includes means for controlling the reproducing means to reproduce the photographed image in accordance with the set reproduction manner.

It may be preferable that the plurality of reproduction manners includes a reproduction manner of reproducing the photographed image while correcting the outline of the photographed image at a selectively settable correction level; and the setting means includes means for setting an outline correction level in accordance with the kind of photographic information ranked on the top priority.

It may be preferable that the plurality of reproduction manners includes a reproduction manner of reproducing the photographed image while correcting the gradation of the photographed image at a selectively settable correction level; and the setting means includes means for setting a gradation correction level in accordance with the kind of photographic information ranked on the top priority.

According to the present invention, furthermore, an image reproducing apparatus for reproducing an photographed image recorded on a film, the apparatus comprising: image pick-up means for picking up the photographed image recorded on the film to generate a video signal of the photographed image; setting means for setting a plurality of gradation characteristics for the photographed image based on the video signal; and correcting means for correcting the gradation of the photographed image in accordance with the plurality of gradation characteristics set by the setting means.

Also, it may be preferable that the setting means includes means responsive to the image pick-up means for judging based on the video signal whether the subject of the photographed image is photographed in a back light condition.

With these image reproducing apparatus, the quality of photographed image, such as gradation and outline, is corrected in consideration of focusing accuracy, magnification, light source, exposure level and the like. Thus, a greatly improved image can be assuredly reproduced.

These and other objects, features and advantages of the present invention will become more apparent upon a reading of the following detailed description and accompanying drawings.

BRIEF DESCRIPTION OF THE DRAWINGS

FIGS. 1A and 1B are block diagrams showing a construction of a first photographed image reproducing apparatus according to the invention;

FIGS. 15A to 15C are diagrams showing a process of searching a boundary line, FIG. 15A showing a raster scan for detecting a tracking start point, FIG. 15B showing a method of detecting a next tracking point by scanning eight image data neighboring a tracking point clockwise, and FIG. 15C showing a method of detecting a next tracking point by scanning eight image data neighboring a tracking point counterclockwise;

FIG. 16 is a diagram showing a photographed image divided into a low luminance combination area, a high luminance combination area and a boundary area;

DETAILED DESCRIPTION OF THE PREFERRED EMBODIMENTS OF THE INVENTION

Figure 1A:
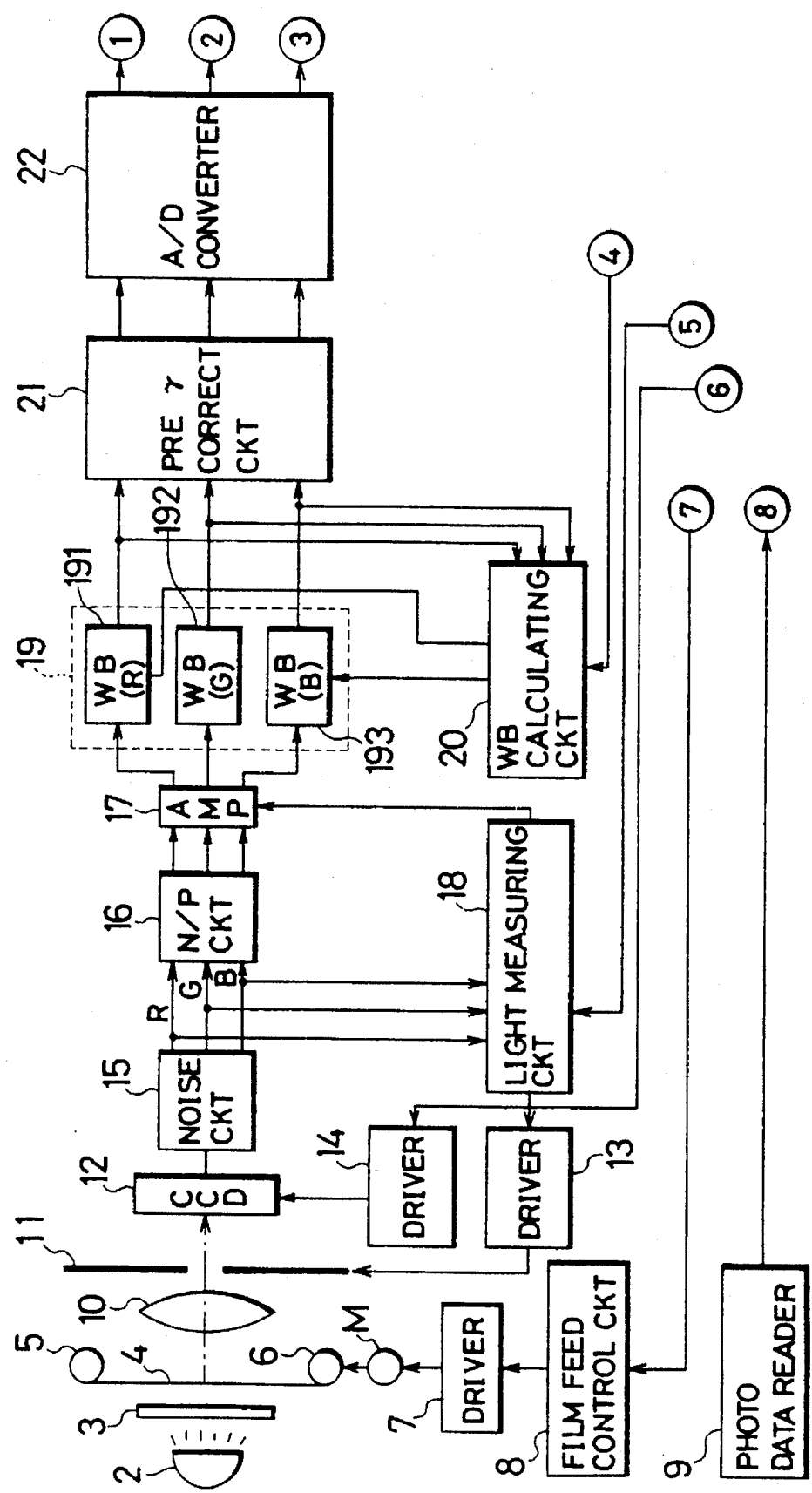
Figure 2A:
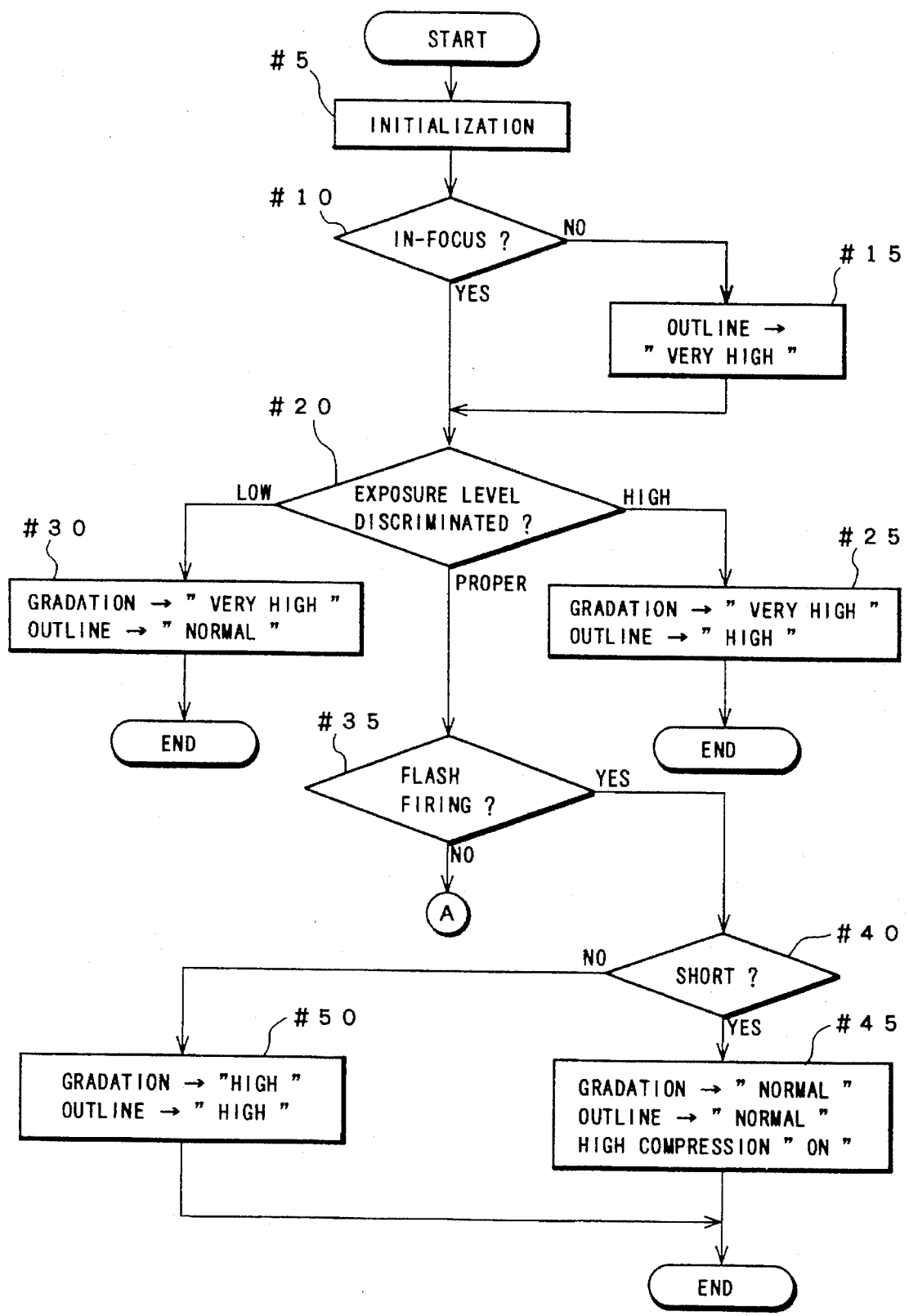
FIGS. 2A to 2D are flow charts showing an image quality correcting operation carried out in the first photographed image reproducing apparatus.
Figure 2B:
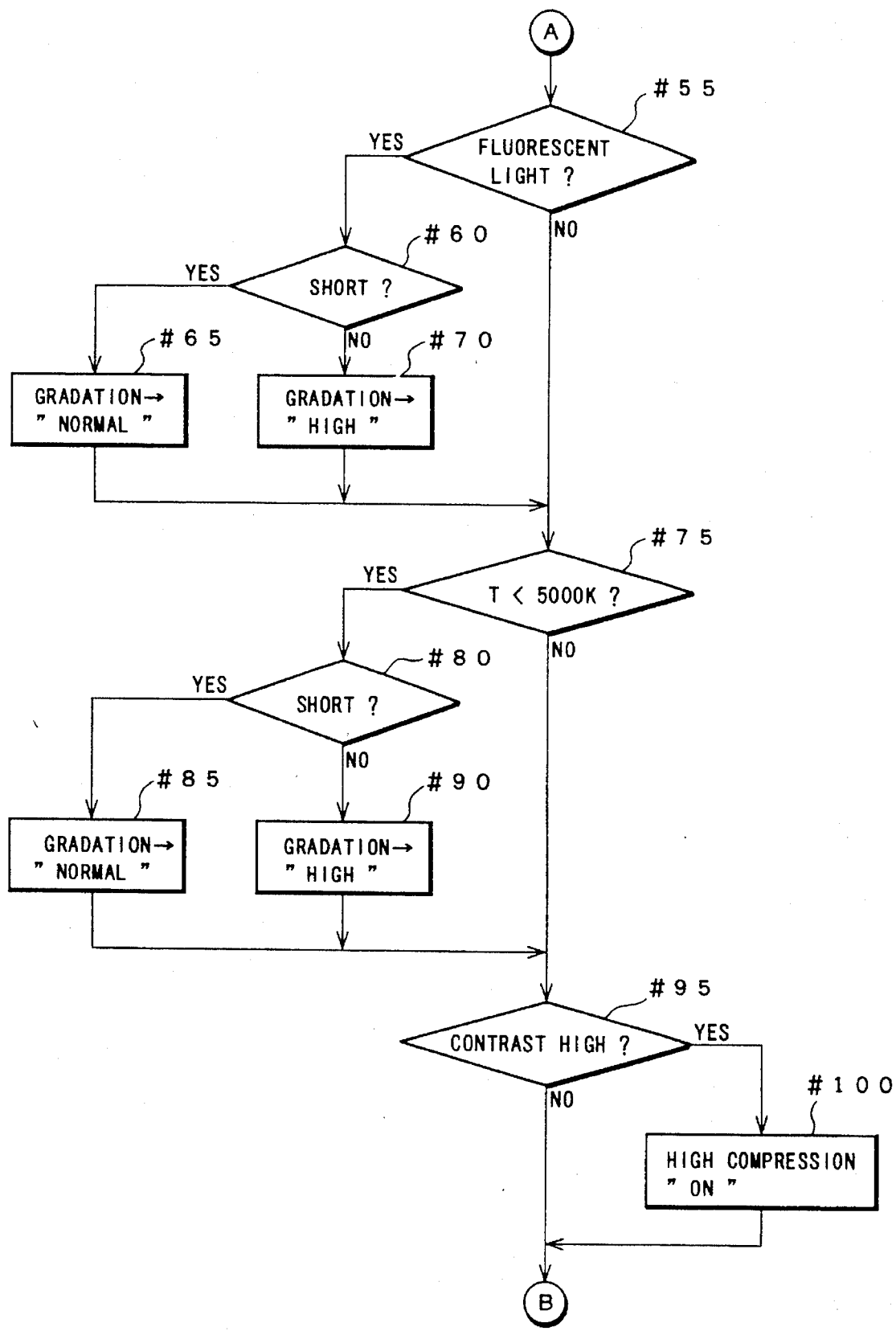
Figure 2C:
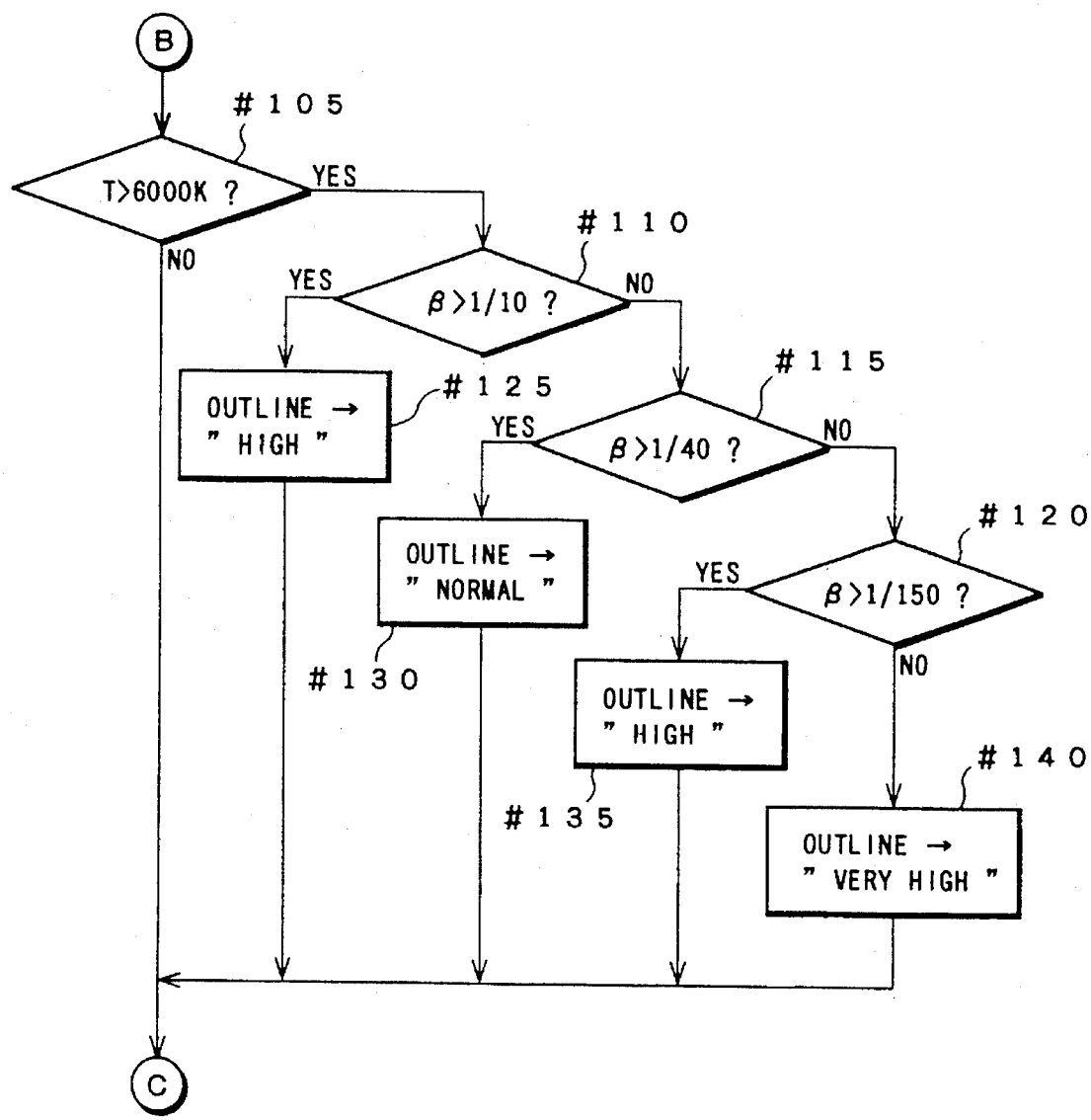
Figure 2D:
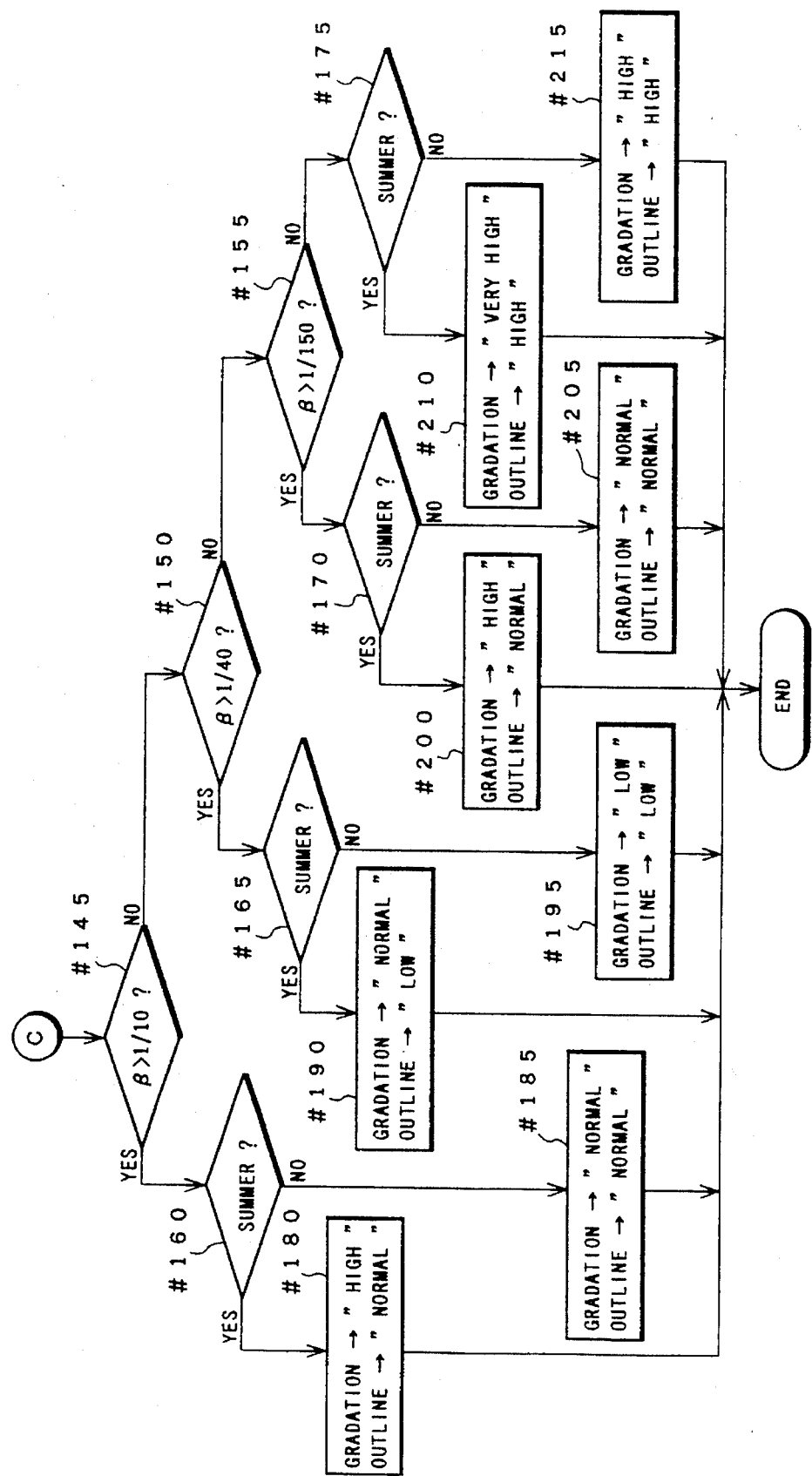

FIGS. 1A and 1B are block diagrams showing the construction of a first photographed image reproducing apparatus according to the invention.

In this figure, indicated at 1 is a microcomputer (hereinafter referred to as CPU) for controlling centrally an overall operation of the photographed image reproducing apparatus. The CPU 1 controls the feeding of frames of a film 4 to be described later and image quality corrections such as gradation and outline corrections for images obtained by picking up images in respective frames. Hereinafter, images in respective frames are referred to as photographed images and those obtained by picking up the photographed images are referred to as a picked up image. The gradation and outline corrections will be described in detail later.

Indicated at 2 is a light source for illuminating the film 4, at 3 a diffusing plate for diffusing the light emitted from the light source 2, at 4 an already developed negative film, and at 5, 6 a pair of rollers for feeding and taking up the film 4. The rollers 5, 6 are driven through a drive mechanism so as to feed frames of the film automatically. This drive mechanism includes a servo motor M as a driving source, a driver 7 for controlling the driving of the servo motor M and a film feed control circuit 8.

The CPU 1 sends a control signal to the film feed control circuit 8 to designate a timing at which the film 4 is fed frame by frame. Upon the receipt of the control signal, the control circuit 8 causes the servo motor M to rotate by a specified amount through the driver 7 so that the film 4 is taken up only by one frame.

Indicated at 9 is a photographing data reader for reading data concerning a photographing operation (hereinafter referred to as photographing data) which are recorded for each frame of the film 4. The photographing data include focusing accuracy, a light source used during the photographing operation, a luminance difference, an exposure level during the photographing operation, a magnification, and a time when the photographing operation is carried out. The photographing data are recorded directly on the film 4 in correspondence with the respective frames or on a storage medium such as a semiconductor memory and a floppy disk.

In the former case, a magnetic recording area is provided outside a photographing region of the film 4 and the photographing data are recorded magnetically in this magnetic recording area in correspondence with the respective frames.

The CPU 1 reads the photographing data of all the frames through the photographing data reader 9 before starting reproducing the photographed images. In the case where the photographing data are recorded directly on the film 4, it may be also appropriate to read the photographing data for the frame while the film 4 are fed to reproduce the photographed image.

Based on the photographing data, the CPU 1 sets the contents of the gradation correction and outline correction (hereinafter referred to as correction data) which are applied to the image signal representing a frame of image to be reproduced. The CPU 1 further transfers the gradation correction data and the outline correction data to a gradation correcting circuit 23 and an enhancer 25 respectively. These correction data will be described in detail later.

Indicated at 10 is a lens; at 11 a diaphragm for adjusting an amount of light falling upon an image pick-up device 12; and at 13, 14 drivers for driving the diaphragm 11 and the image pick-up device 12 respectively. The lens 10 is disposed at a suitable position before the film 4 and focuses the photographed image on a sensing surface of the image pick-up device 12. An operation of the driver 13 is controlled by a light measuring circuit 18 to be described later.

The image pick-up device 12 includes a color CCD image sensor of the single plate type. In this image sensor, photoelectric conversion elements such as photodiodes are arranged two-dimensionally in a matrix and a color filter of red (R), green (G) or blue (B) is arranged on a light receiving surface of each photoelectric conversion element. The device 12 reads a light image of the photographed image formed on the sensing surface while converting the same into an electric signal (hereinafter referred to as an image signal); separates the image signal into color image signals of R, G, B; and sends these color image signals to a processing circuit.

Indicated at 15 is a noise suppressing circuit for suppressing the level of a noise generated in the image pick-up device (hereinafter referred to as a CCD). This circuit 15 includes a correlation double sampling (CDS) circuit for reducing, for example, a reset noise and a low pass filter (LPF) for reducing a sampling noise. Indicated at 16 is a negative/positive (N/P) inverting circuit for inverting an image signal corresponding to a negative image into the one corresponding to a positive image. Indicated at 17 is an amplifying circuit (AMP) for adjusting a gain of the image signal, and at 18 the light measuring circuit for measuring the luminance of the photographed image to be picked up.

The noise suppressing circuit 15 sends the respective color image signals to the N/P inverting circuit 16 and the light measuring circuit 18. The light measuring circuit 18 calculates the luminance of the photographed image based on the received color image signals and calculates further an exposure control value and a proper level of the image signal based on the calculated luminance. The circuit 18 outputs the exposure control value to the driver 13 so as to set an opening amount of the diaphragm 11 at a specified value through the driver 13 and outputs the proper level to the AMP 17 so as to adjust the level of each color image signal to a proper value.

Indicated at 19 is a white balance (WB) circuit for applying a white balance correction to the respective color image signals, and at 20 a WB calculating circuit for calculating a proper WB correction value and controlling the driving of the WB circuit 19 based on this calculation result.

The WB circuit 19 includes three WB amplifiers 191, 192, 193 corresponding to the respective color image signals of R, G, B. Outputs of the WB amplifiers 191 to 193 are input to the WB calculating circuit 20. Based on the input color image signals, the circuit 20 calculates a level ratio R/G of the red image signal to the blue image signal and a level ratio B/G of the blue image signal to the green image signal. Based on these calculation results, the circuit 20 calculates such gains of the WB amplifiers 191, 193 that output levels of the red and blue image signals corresponding to a lowest tone portion of a reproduced image coincide with that of the image signal. Based on the calculated gains, the circuit 20 adjusts the gains of the WB amplifiers 191, 193 so as to correct the white balance of the image signal.

Indicated at 21 is a preliminary gradation correcting circuit for compressing signal components having a level higher than a predetermined value to enhance a dynamic range of a high level area (highlight area) of the image signal. Indicated at 22 is an analog-to-digital (A/D) converter for converting the respective analog color image signals of R, G, B into digital image signals, and at 23 a gradation correcting unit for correcting the gradation of the image signal.

The gradation correcting unit 23 includes three gradation correcting circuits 231, 232, 233 in correspondence with the color image signals of R, G, B. Each of the gradation correcting circuits 231, 232, 233 includes a look-up table (LUT) storing a plurality of gradation correction tables, and corrects the level of the image signal input from the A/D converter 22 using a correction value from the gradation correction table corresponding to the gradation correction data input from the CPU 1.

Indicated at 24 is a matrix circuit for generating a luminance signal (Y-signal) and color difference signals (R-Y), (B-Y) from the respective color image signals of R, G. Indicated at 25 is an enhancer for applying the outline correction to the Y-signal in horizontal and vertical directions. Indicated at 26, 27 are low pass filters (LPF) for restricting the bands of the color difference signals (R-Y), (B-Y) to specified bands. Indicated at 28 is a NTSC encoder for converting the Y-signal and the color difference signals (R-Y), (B-Y) into a NTSC signal, and at 29 a D/A converter for converting the digital NTSC signal to an analog one.

Indicated at SW1 to SW3 are switches which are operated to instruct externally the gradation and outline corrections for the picked up image. The switch SW1 is operated to instruct the gradation correction; the switch SW2 to instruct the outline correction; and the switch SW3 to instruct the gradation correction in the highlight area.

In the above construction, upon the receipt of an external signal designating the feeding of frame, the CPU 1 causes the drive mechanism including the film feed control circuit 8, the driver 7 and the servo motor M to take up the film 4 only by one frame so that a next frame is set at a specified position.

Subsequently, the CPU 1 drives the CCD 12 through the driver 14 so as to control the exposure operation, thereby picking up the photographed image. The image signal representing this picked up image is separated into three color image signals of R, G, B in the CCD 12 and are sent to the noise suppressing circuit 15. After the noises such as the reset noise and the sampling noise are suppressed in the noise suppressing circuit 15, the color image signals are sent to the light measuring circuit 18. The light measuring circuit 18 smooths the received color image signals by adding these signals at a specified ratio to thereby generate the Y-signal, and calculates an exposure control value using the Y-signal. The light measuring circuit 18 also sets the diaphragm 11 at a specified aperture value through the driver 13 based on the calculated exposure control value.

Based on the calculated exposure control value, the CPU 1 drives the CCD 12 through the driver 14 so as to reproduce the photographed image on an unillustrated TV monitor, thereby conducting the second image pick-up operation of the photographed image. After the noises are suppressed in the noise suppressing circuit 15 as described above, the image signal representing this picked up image is sent to the N/P inverting circuit 16, in which the image signal is converted into the one corresponding to a positive image. Thus obtained image signal has the level thereof adjusted to a suitable value based on the exposure control value in the AMP 17 and then the WB correction is applied thereto in the WB circuit 19.

The respective color image signals after the WB correction have the gradation correction applied to the highlight areas thereof in the preliminary gradation correcting circuit 21 and are then converted into digital signals in the A/D converter 22. A specified gradation correction is applied to thus obtained digital signals in the gradation correcting circuit 23.

Thereafter, the Y-signal, (R-Y) signal, (B-Y) signal are generated from the color image signals of R, G, B in the matrix circuit 24. The Y-signal is input to the NTSC encoder 28 after the outline correction in the horizontal and vertical directions is applied thereto in the enhancer 25. The (R-Y), (B-Y) signals are input to the NTSC encoder 28 after the bands thereof are restricted to the specified bands in the LPFs 26, 27.

The Y-, (R-Y), (B-Y) signals are converted into the NTSC signal including the Y-signal and C-signal in the NTSC encoder 28. The NTSC signal is output to the unillustrated TV monitor after being converted into the analog signal in the D/A converter 29. The TV monitor converts the input NTSC signal into color image signals of R, G, B. Based on these color image signals, a cathode ray tube is driven to reproduce the photographed image.

The following TABLEs I-1, I-2, I-3, and II show relationships between contents of the photographing data and those of the corrections.

In these tables, "X", "*" denote contents falling under the photograph ing data and the corrections. "X" is mark for the gradation correction while "*" being a mark for the outline correction.

In this embodiment, the contents or each of the gradation correction and the outline correction is classified into four types: "low (L)", "normal (N)", "high (H)", and "very high (VH)". The "normal" level is a standard correction level and the other levels "low", "high", "very high" are relative levels in relation to the "normal" level.

It should be understood that, although the contents of the gradation and outline corrections are classified into four types in this embodiment, they can be classified into a desired number types.

A "high compression" refers to a correction in which the highlight area of the picked up image is compressed to expand the gradation range. The "high compression" is written as an item different from the gradation correction, but is performed as a part of the gradation correction in the actual correction of the picked up image.

More specifically, in this embodiment, the contents of the gradation correction are classified into the above-mentioned four types. For each type, there are some cases where the "high compression" is carried out and other cases where it is not carried out. In the actual correction, a suitable correction content according to the content of the photographing data is selected out of the following eight types of gradation contents: "low", "normal", "high", "very high", "low+high compression", "normal+high compression", "high+high compression" and "very high+high compression".

Accordingly, the gradation correcting unit 23 includes at least eight types of gradation correction tables and applies the gradation correction to the picked up image using the gradation correction table corresponding to the content of the photographing data to be described later.

In these tables. "(X)" denotes the application of the compression when the luminance difference of the photographed image is large. For instance, when the content of the photographing data of the photographed image falls under No. 20, the "high" gradation correction is applied if the luminance difference is not large while the "high+high compression"gradation correction is applied if the luminance difference is large.

TABLE I-1

| | | MAGNIFICATION β | | | |
|---|---|---|---|---|---|
| | | NEAR PHOTOGRAPHY | | DISTANT PHOTOGRAPHY | |
| NO. | TIME SUMMER | MACRO <1/10 | PORTRAIT 1/10~1/40 | COLLECTIVE 1/40~1/150 | LANDSCAPE >1/150 |
| 1 | | | | | |
| 2 | | | | | |
| 3 | | | | | |
| 4 | | X* | X* | | |
| 5 | | | | X* | X* |
| 6 | | X | X | | |
| 7 | | | | | |
| 8 | | | | X | X |
| 9 | | | | | |
| 10 | | * | | | |
| 11 | | | * | | |
| 12 | | | | * | |
| 13 | | | | | * |

TABLE I-1-continued

| | | MAGNIFICATION β | | | |
|---|---|---|---|---|---|
| | | NEAR PHOTOGRAPHY | | DISTANT PHOTOGRAPHY | |
| NO. | TIME SUMMER | MACRO <1/10 | PORTRAIT 1/10~1/40 | COLLECTIVE 1/40~1/150 | LANDSCAPE >1/150 |
| 14 | | ※ | | | |
| 15 | | | ※ | | |
| 16 | | | | ※ | |
| 17 | | | | | ※ |
| 18 | ※ | ※ | | | |
| 19 | ※ | | ※ | | |
| 20 | ※ | | | ※ | |
| 21 | ※ | | | | ※ |
| 22 | | * | | | |
| 23 | | | * | | |
| 24 | | | | * | |
| 25 | | | | | * |
| 26 | * | * | | | |
| 27 | * | | * | | |
| 28 | * | | | * | |
| 29 | * | | | | * |

TABLE I-2

| | EXPOSURE LEVEL | | | |
|---|---|---|---|---|
| NO. | HIGH >+4 (EV) | PROPER +4~-1 (EV) | LOW -1> (EV) | LARGE DIFFERENCE |
| 1 | | | | |
| 2 | ※* | | | |
| 3 | | | ※* | |
| 4 | | | | |
| 5 | | | | |
| 6 | | ※ | | |
| 7 | | ※ | | |
| 8 | | ※ | | |
| 9 | | ※ | | |
| 10 | | * | | |
| 11 | | * | | |
| 12 | | * | | |
| 13 | | * | | |
| 14 | | ※ | | (※) |
| 15 | | ※ | | (※) |
| 16 | | ※ | | (※) |
| 17 | | ※ | | (※) |
| 18 | | ※ | | (※) |
| 19 | | ※ | | (※) |
| 20 | | ※ | | (※) |
| 21 | | ※ | | (※) |
| 22 | | * | | |
| 23 | | * | | |
| 24 | | * | | |
| 25 | | * | | |
| 26 | | * | | |
| 27 | | * | | |
| 28 | | * | | |
| 29 | | * | | |

TABLE I-3

| | LIGHT SOURCE | | COLOR TEMPERATURE | | | |
|---|---|---|---|---|---|---|
| NO. | FLASH LIGHT | FLUORESCENT LIGHT | 5000K | 5000K~6000K | 6000K | OUT OF FOCUS |
| 1 | | | | | | * |
| 2 | | | | | | |
| 3 | | | | | | |
| 4 | ※* | | | | | |
| 5 | ※* | | | | | |
| 6 | | ※ | | | | |
| 7 | | ※ | | | | |
| 8 | | | ※ | | | |
| 9 | | | ※ | | | |
| 10 | | | | | | * |
| 11 | | | | | | * |
| 12 | | | | | | * |
| 13 | | | | | | * |
| 14 | | | | ※ | ※ | |
| 15 | | | | ※ | ※ | |
| 16 | | | | ※ | ※ | |

TABLE I-3-continued

| | LIGHT SOURCE | | COLOR TEMPERATURE | | | |
|---|---|---|---|---|---|---|
| NO. | FLASH LIGHT | FLUORESCENT LIGHT | 5000K | 5000K~6000K | 6000K | OUT OF FOCUS |
| 17 | | | | X | X | |
| 18 | | | | X | X | |
| 19 | | | | X | X | |
| 20 | | | | X | X | |
| 21 | | | | X | X | |
| 22 | | | | * | * | |
| 23 | | | | * | * | |
| 24 | | | | * | * | |
| 25 | | | | * | * | |
| 26 | | | | * | * | |
| 27 | | | | * | * | |
| 28 | | | | * | * | |
| 29 | | | | * | * | |

TABLE II

| | GRADATION CORRECTION | | | | OUTLINE CORRECTION | | | | HIGH |
|---|---|---|---|---|---|---|---|---|---|
| NO. | L | N | H | VH | L | N | H | VH | COMPRESSION |
| 1 | | | | | | | * | | |
| 2 | | X | | | * | | | | |
| 3 | | X | | | * | | | | X |
| 4 | X | | | | * | | | | |
| 5 | | X | | | | * | | | |
| 6 | X | | | | | | | | |
| 7 | | X | | | | | | | |
| 8 | X | | | | | | | | |
| 9 | | X | | | | | | | |
| 10 | | | | | | | * | | |
| 11 | | | | | | * | | | |
| 12 | | | | | | | * | | |
| 13 | | | | | | | | * | |
| 14 | | X | | | | | | | (X) |
| 15 | X | | | | | | | | (X) |
| 16 | | X | | | | | | | (X) |
| 17 | | | X | | | | | | (X) |
| 18 | | | X | | | | | | (X) |
| 19 | | X | | | | | | | (X) |
| 20 | | | X | | | | | | (X) |
| 21 | | | | X | | | | | (X) |
| 22 | | | | | | * | | | |
| 23 | | | | | * | | | | |
| 24 | | | | | | * | | | |
| 25 | | | | | | | * | | |
| 26 | | | | | | * | | | |
| 27 | | | | | * | | | | |
| 28 | | | | | | * | | | |
| 29 | | | | | | | * | | |

Here will be described briefly the relationship between the content of the photographing data and the correction content.

(1) Photographing Time

A picture taken in midsummer can, for example, present an atmosphere of midsummer by enhancing the gradation of the picked up image more than the pictures taken in other times of the year. The photographed image having the photographing condition of No. 14 and the one having the photographing condition of No. 18 have the same photographing condition except the photographing time.

Accordingly, the gradation correction for the photographed image having the photographing condition of No. 18 is one stage higher than the one for the photographed image having the photographing condition of No. 14. The same applies to the relationship between the photographing images having the photographing conditions of No. 15 and No. 19; No. 16 and No. 20; and No. 17 and No. 21.

The photographing time is discriminated, for example, based on the photographing data recorded in correspondence with the frames of the film 4. In this embodiment, the frames of images photographed in, e.g., July and August are determined as those photographed in summer.

(2) Magnification

In the picture taking operation, the magnification is set large when the subject is large such as in a landscape picture while being set small when the subject is small such as in a portrait. In this way, the magnification changes according to the photographed content such as the subject to be photographed and the photographing purpose. Thus, the photographed content of the photographed image is classified based on the magnification, and proper gradation and outline corrections are applied according to the classified type.

In this embodiment, the photographed contents of the photographed images are classified into four types based on the magnification $\beta$: a landscape image including images of the buildings or the landscapes; a collective image including images of a plurality of people as seen in a souvenir picture; a portrait image; and a macrophotographed image such as a flower image photographed from a very close position.

When the subject is a person or the like, a suitable angle of view is obtainable by increasing the magnification $\beta$ as the distance from the camera to the subject person (hereinafter referred to as the photographing distance) becomes longer. Accordingly, the proper gradation and outline corrections are applied according to the photographing distance. Particularly when the photographing operation is carried out with the assist of a flash device, an amount of light illuminating the subject person differs depending upon the photographing distance. Thus, when the subject person stands close to the camera, he is illuminated more than necessary and consequently his image looks whitish relative to the background image in a picture. On the contrary, when the subject person stands far away from the camera, this results in insufficient contrast between the background image and the subject image.

In this embodiment, the photographing distance is discriminated to be short or long based on the magnification $\beta$ and the relationship of the magnification $\beta$, the photographed content, and the photographing distance is defined as shown in TABLE III below.

TABLE III

| MAGNIFICATION β | PHOTOGRAPHED CONTENT | PHOTOGRAPHING DISTANCE |
| --- | --- | --- |
| β > 1/10 | MACROPHO. IMAGE | SHORT |
| 1/10 ≧ 1/40 | PORTRAIT IMAGE | SHORT |
| 1/40 ≧ 1/150 | COLLECTIVE IMAGE | LONG |
| 1/150 ≧ β | LANDSCAPE IMAGE | LONG |

The relationship of the magnification β, the photographed content and the photographing distance defined in TABLE III is only an example and upper and lower limits of the magnification β for each range can be set desirably. Further, the photographed content and the photographing distance can be classified desirably into an arbitrary number of types.

(3) Exposure Level

When the exposure level during the photographing operation is beyond upper and lower limits of a specified range, it is beyond a permissible exposure range of the film 4 and therefore the film 4 cannot be exposed properly. Since the image photographed under such an improper exposure condition has an unnatural contrast, the gradation correction is applied to the extent that a signal to noise ratio of the image signal is not deteriorated.

In this embodiment, the exposure level E is proper when it lies in the range: +4 (EV)≧E≧−1 (EV).

(4) Luminance Difference

When the photographed image has an extremely wide luminance range such as in a picture photographed in a back light condition, the highlight area of the picked up image is compressed so as to expand the gradation range of this highlight area. Accordingly, when the luminance difference is large despite the proper exposure level, the gradation correction including the "high compression" processing is carried out as shown in TABLE II.

(5) Light Source

A picture photographed under a light source having a low color temperature such as the fluorescent light, the tungsten light, and the sunlight when the sun rises in the morning or sets in the evening tends to be overall unclear compared to the one photographed under the sunlight during daytime on a fine day. Accordingly, the gradation and outline corrections are applied to the picked up image in consideration of the photographing distance so as to adjust the quality of the reproduced image to a proper level.

Since a picture photographed under the sunlight, for example, on a cloudy day or in the shade has overall low contrast, the outline correction is applied to the picked up image in consideration of the photographing distance in this case, so as to adjust the contrast of the reproduced image to a proper level. In this embodiment, the color temperature T of the light source is classified as shown in TABLE IV.

TABLE IV

| COLOR TEMPERATURE | LIGHT SOURCE |
| --- | --- |
| T < 5000K | TUNGSTEN LIGHT, SUN LIGHT DURING SUNRISE & SUNSET |
| 5000K ≦ T ≦ 6000K | SUNLIGHT DURING DAYTIME |
| 6000K < T | CLOUDY DAY, IN THE SHADE |

Since the flash light has in substance the same color as the sunlight, the picture photographed with the assist of flash light is less likely to suffer from the above problem. However, the amount of light illuminating the main subject differs depending upon the photographing distance, thus the contrast of the main subject image and the background image may look unnatural when this amount of light is improper.

For example, when the person standing relatively close to the camera is photographed at night with the assist of flash light, the image of this person may look whitish relative to the background image because the flash light is reflected mainly by this person. Thus, the gradation and outline corrections are applied to the picked up image in consideration of the photographing distance in the case of the flash firing photographing operation, so as to adjust the contrast of the reproduced image to a proper level.

(6) Focusing Accuracy

When the photographed image is out of focus, the outline is unclear. Accordingly, the outline correction is applied to the picked up image so as to make the reproduced image clearer.

There will be described an operation of setting a specified correction content according to the content of the photographing data next with reference to flow charts shown in FIGS. 2A to 2D.

In these flow charts, it is written as if the correction content set based on a previous discrimination result were changed and set based on a subsequent discrimination result. However, this flow chart is written in simplified manner only to avoid the complication. The correction content set based on the previous discrimination result is prioritized over the one set based on the subsequent discrimination result, and is not changed and set based on the subsequent discrimination result.

For instance, the outline correction set at "very high" level in Step #15 after the photographed image is discriminated not to be in focus in Step #10 is not changed to "high" level in Step #25 even if the exposure level is discriminated to be high in Step #20. In this case, only the gradation correction is set at "very high" level in Step #25 and the level of the outline correction set in Step #15 is maintained at "very high".

The correction content setting operation to be described later is performed by the CPU 1. Upon the completion of the correction content setting operation, the CPU 1 transfers the set gradation correction content to the gradation correcting unit 23 and the set outline correction content to the enhancer 25. The gradation correction (including the high compression processing) and the outline correction are applied to the picked up image respectively in the gradation correcting unit 23 and the enhancer 25.

First of all, the CPU 1 initializes the correction contents such as the gradation correction, the outline correction and the necessity of high compression processing (Step #5). In this initialization, initial values may be those indicative of states where the correction contents are not set, or those indicative of specific contents. In the latter case, for example, the gradation and outline corrections are set at "normal" level and the high compression processing is set at "absence" (it is noted that "absence" here means that the high compression processing is not necessary).

Subsequently, the CPU 1 discriminates whether the photographed image is in focus based on the in-focus data of the photographing data (Step #10). If the photographed image is not in focus, the level of the gradation correction and the presence/absence of the high compression processing are set based on the other photographing data in Step #20 and subsequent steps, after the level of the outline correction is set at "very hard" (Step #15, see No. 1 in TABLEs I-1 to II). Since the outline of the photographed image is unclear when the photographed image is not in focus, it is emphasized as much as possible to make the photographed image clearer.

On the other hand, if the photographed image is in focus (YES in Step #10), the levels of the outline and gradation corrections and the presence/absence of the high compression processing are set based on the other photographing data in Step #20 and subsequent steps.

The CPU 1 then discriminates whether the exposure level of the photographed image is proper based on the exposure level data included in the photographing data in Step #20. When the exposure level E is high (E>+4EV), the levels of the gradation and outline corrections are set at "very high" and "high" respectively (Step #25) and this routine ends (see No. 2 in TABLEs I-1 to II). When the exposure level E is low (−1EV>E), the levels of the gradation and outline corrections are set at "very high" and "normal" respectively (Step #30) and this routine ends (see No. 3 in TABLEs I-1 to II).

When the exposure level E is improper, the range of the luminance recorded on the film 4 is narrow and accordingly the contrast of the highlight area or shadow area of the photographed image is reduced. The reduction in the contrast is prevented by increasing the gradation level as much as possible and increasing the outline level to the extent that the signal to noise ratio is not deteriorated.

When the exposure level E is proper (+4EV≧E≧−1EV) in Step #20, it is discriminated whether the flash device has been fired during the photographing operation (Step #35). In the case of the flash firing photographing operation (YES in Step #35), it is discriminated whether the photographing distance is shore based on the magnification β (Step #40).

If the photographing distance is short (β>1/40) in Step #40, the levels of the gradation and outline corrections are set at "normal" and "normal" and the presence of the high compression processing is set (Step #45, see No. 4 in TABLEs I-1 to II). If the photographing distance is long (β≧1/40) in Step #40, the levels of the gradation and outline corrections are set at "high" and "high" respectively (Step #50, see No. 5 in TABLEs I-1 to II). Then, this routine ends.

More specifically, in the case where the photographing distance is short in the flash firing photographing operation, the main subject image tends to look whitish relative to the background image because of the excessive flash light reflected by the main subject. Accordingly, the high compression processing is applied so that the main subject image can be reproduced properly. Conversely, in the case where the photographing distance is long in the flash firing photographing operation, the contrast of the main subject image and the background image reduces due to the insufficient amount of flash light. Thus, the contrast level is increased by emphasizing the outline.

In the case of the non-flash firing photographing operation (NO in Step #35), it is discriminated whether the light source is the fluorescent light (Step #55). If the light source is the fluorescent light (YES in Step #55), it is discriminated based on the magnification β whether the photographing distance is short (Step #60).

If the photographing distance is short (β≧1/40) in Step #60, the level of the gradation correction is set at "normal" (Step #65). On the contrary, if the photographing distance is long (1/40≧β) in Step #60, the level of the gradation correction is set at "high" (Step #70). Thereafter, this routine proceeds to Step #75 (see Nos. 6 and 7 in TABLEs I-1 to II). If the light source is not the fluorescent light (NO in Step #55), this routine proceeds directly to Step #75 skipping Steps #60 to #70.

It is discriminated whether the color temperature T of the light source is low, i.e., T<5000K in Step #75. If the color temperature T of the light source is low (YES in Step #75), it is further discriminated based on the magnification β whether the photographing distance is short (Step #80).

If the photographing distance is short (β>1/40) in Step #80, the level of the gradation correction is set at "normal" (Step #85). On the contrary, if the photographing distance is long (1/40≧β) in Step #80, the level of the gradation correction is set at "high" (Step #90). Thereafter, this routine proceeds to Step #95 (see Nos. 8 and 9 in TABLEs I-1 to II). If the color temperature T of the light source is not low (NO in Step #75), this routine proceeds directly to Step #95 skipping Steps #80 to #90.

Specifically, the photographed image tends to be unclear when the light source is the tungsten light or sunlight during the sunrise or sunset and is more unclear particularly when the photographing distance is long. Accordingly, in Steps #55 to #90, the gradation level is increased so as to make the photographed image clearer.

Subsequently in Step #95, it is discriminated based on the luminance difference data whether the contrast is high. If the contrast is high (YES in Step #95), the high compression processing is set on. If the contrast is not high (NO in Step #95), this routine proceeds to Step #100 without setting the high compression processing on (see Nos. 14 to 21 in TABLEs I-1 to II).

The image photographed under the condition where the luminance difference is large, e.g., when the photographing operation is conducted in a back light condition has a wide gradation range at high luminance side. Accordingly, in Step #100, the gradation range is expanded by compressing the highlight area of the photographed image (background image area), so that the highlight area can be properly reproduced.

In Step #105, it is discriminated whether the color temperature T of the light source is high, e.g., T>6000K. If the color temperature T is high (YES in Step #105), the content of the photographed image is classified as one of the macrophotographed image, the portrait image, the collective image, or the landscape image based on the magnification β (Steps #110 to #120). The level of the outline correction is set according to this classification result (Steps #125 to #140), and then this routine proceeds to Step #145 (see Nos. 10 to 13 in TABLEs I-1 to II). If the color temperature T is not high (NO in Step #105), this routine proceeds directly to Step #145.

More specifically, if the photographed image is classified as the macrophotographed image (YES in Step #110) or the collective image (YES in Step #120), the level of the outline correction is set at "high". If the photographed image is classified as the portrait image (YES in Step #115), the level of the outline correction is set at "normal". If the photographed image is classified as the landscape image (NO in Step #115), the level of the outline correction is set at "very high".

When the color temperature T of the light source is high, the photographed image tends to be unclear. When this photographed image is reproduced, the viewer becomes less satisfied therewith as the size of the subject relative to the screen becomes smaller (as the photographing distance becomes longer). Thus, in Steps #110 to #140, the outline of the image is emphasized more in the order of the portrait, the collective image and the landscape image.

The purpose of macrophotography is different from those for taking the portrait, collective picture, and landscape picture. Its purpose is to photograph clear only a subject such as a flower. In consideration of this photographing purpose, the outline is more emphasized for the macrophotographed image than for the portrait image.

In Steps #145 to #155, the content of the photographed image is classified as one of the above four types based on the magnification β. It is further discriminated whether the photographing time is summer (Steps #160 to #175). The levels of the gradation and outline corrections are set according to this discrimination result (Steps #180 to #215).

More specifically, if the photographing time is not summer and the photographed image is classified as either the macrophotographed image (NO in Step #160) or the collective image (NO in Step #170), the levels of the gradation and outline corrections are set respectively at "normal". If the photographing time is not summer and the photographed image is classified as the portrait image (NO in Step #165), the levels of the gradation and outline corrections are set respectively at "low". If the photographing time is not summer and the photographed image is classified as the landscape image (NO in Step #175), the levels of the gradation and outline corrections are set respectively at "high" (see Nos. 14 to 17, Nos. 22 to 25 in TABLEs I-1 to II).

If the photographing time is summer and the photographed image is classified as either the macrophotographed image (YES in Step #160) or the collective image (YES in Step #170), the levels of the gradation and outline corrections are set respectively at "high" and "normal". If the photographing time is summer and the photographed image is classified as the portrait image (YES in Step #165), the levels of the gradation and outline corrections are set respectively at "normal" and "low". If the photographing time is summer and the photographed image is classified as the landscape image (YES in Step #175), the levels of the gradation and outline corrections are set respectively at "very high" and "high" (see Nos. 18 to 21, Nos. 26 to 29 in TABLEs I-1 to II).

It should be understood that the gradation correction Steps #180 to #215 includes the high compression processing if the high compression processing is set on in Step #100. For example, the level of the gradation correction is set at "high+high compression processing" in Step #180.

In the foregoing embodiment, the quality of image is corrected through the gradation and outline corrections based on the contents of the photographing data. However, only one of the gradation or outline correction may be performed to correct the quality of image, or a color correction may be performed additionally.

There will be next described a second photographed image reproducing apparatus according to the invention.

Figure 5:
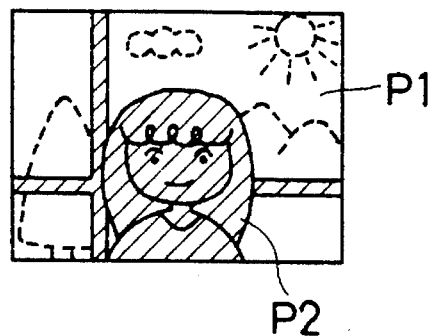
FIG. 5 is a diagram showing an exemplary image reproduced from an image photographed in a back light condition.

FIG. 5 is a diagram showing an exemplary image reproduced from an image photographed in a back light condition. An area P1 indicated by dotted line including images of mountains and a tree is a background image area, and an area P2 indicated by solid line including images of window frames and a girl is a main subject image area. As shown in this figure, because the photographing operation was conducted in a back light condition, the background image area P1 looks too bright and whitish and the main subject image area P2 looks too dark and blackish.

Figure 6:
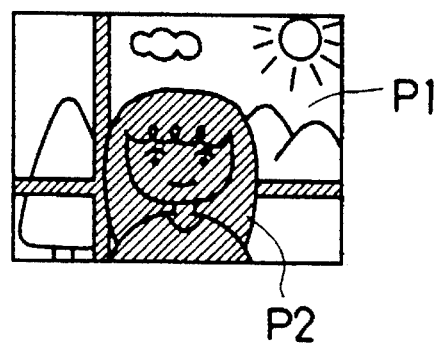
FIG. 6 is a diagram showing a reproduced image of a photographed image which was picked up while adjusting an exposure on the basis of a high luminance area.
Figure 7:
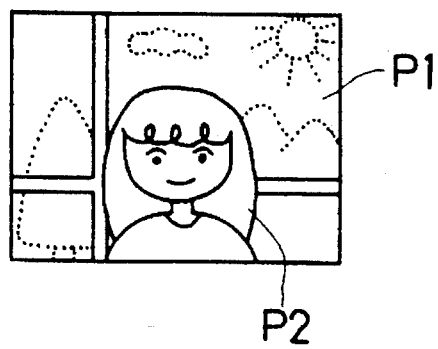
FIG. 7 is a diagram showing a reproduced image of a photographed image which was picked up while adjusting an exposure on the basis of a low luminance area.

When the photographed image having a large luminance difference between the background image area P1 and the main subject image area P2 is to be reproduced on a TV monitor or the like, it is possible to adjust the exposure at the time when the photographed image is picked up from the negative film 4. However, if the exposure is adjusted with respect to the background image area P1, the main subject image area P2 becomes too dark as shown in FIG. 6. On the other hand, if the exposure is adjusted with respect to the main subject image area P2, the background image area P1 becomes too whitish as shown in FIG. 7. These types of exposure adjustments do not lead to a proper luminance balance between the background image area P1 and the main subject image area P2 in the reproduced image.

The second photographed image reproducing apparatus is capable of correcting properly the luminance balance of a photographed image having a large luminance difference and reproducing a clearly defined image on a TV monitor or the like.

Since the photographed image to be processed is a negative image and its luminance distribution is reverse from the one in the reproduced image, the following description is given on the basis of the luminance distribution in the reproduced image, unless particularly mentioned, in order to avoid the confusion in the expression of the luminance. Accordingly, the background image area P1 is treated as a high luminance area and the main subject image area P2 as a low luminance area.

Figure 3:
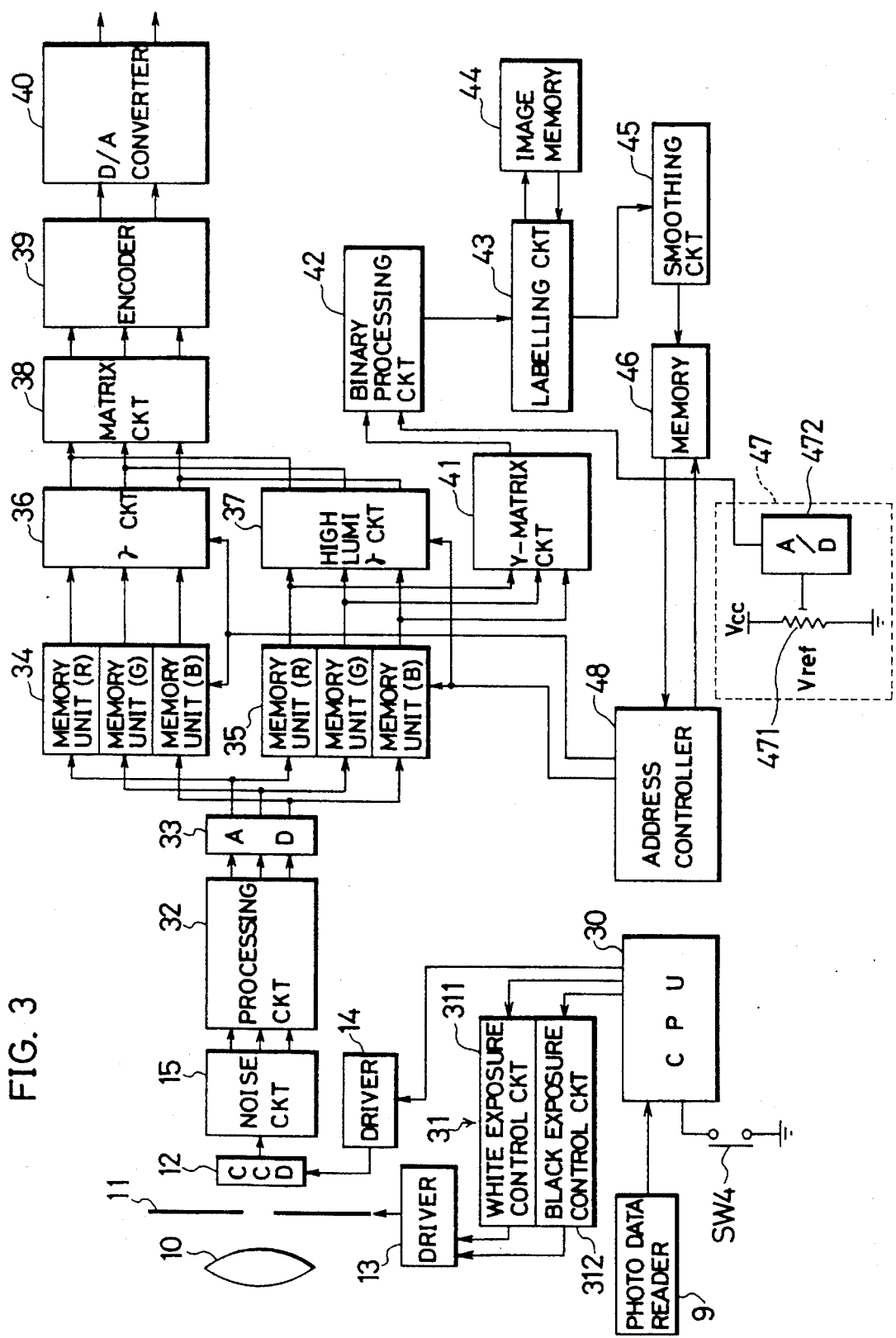
FIG. 3 is a block diagram showing a construction of a second photographed image reproducing apparatus according to the invention.

FIG. 3 is a block diagram showing the construction of the second photographed image reproducing apparatus.

In this figure, elements 9 to 14 correspond to parts having the same reference numerals in FIGS. 1A and 1B and have same functions as those. Indicated at 30 is a CPU for controlling centrally an operation of the photographed image reproducing apparatus, at 31 an aperture control circuit for controlling an aperture value of a diaphragm 11, and at SW4 a switch which is operated to set manually a luminance balance correction mode to be described later.

The luminance balance correction mode is a mode wherein the luminance balance of a photographed image having a large luminance difference is adjusted to a proper level. When the photographing data include a data representing the photographing operation against the like (e.g., large luminance difference), this mode is set automatically. This mode can be set manually by operating the switch SW4.

In the luminance balance correction mode, the photographed image is picked up twice based on first and second exposure values which are set respectively on the basis of the luminance in the high and low luminance areas. An image in the high luminance area is extracted from the first picked up image and an image in the low luminance area is extracted from the second picked up image. The luminance balance of the overall reproduced image is corrected by combining these two extracted images.

The aperture control circuit 31 includes a white reference exposure control circuit 311 and a black reference exposure control circuit 312. The circuit 311 causes the diaphragm 11 to have an aperture value corresponding to such a predetermined exposure value (corresponding to the first exposure value) as not to cause an underflow in the maximally dense area (highest luminance area) of the negative film 4. The circuit 312 causes the diaphragm 11 to have an aperture value corresponding to such a predetermined exposure value (corresponding to the second exposure value) as not to cause an overflow in the minimally dense area (lowest luminance area) of the negative film 4. The aperture control circuit 31 causes the diaphragm 11 to have a white or black reference aperture value based on a command signal from the CPU 30.

Indicated at 32 is a processing circuit for applying a specified signal processing such as a gain control, a white balance correction, and a negative-to-positive inversion to respective color image signals of R, G, B. Indicated at 33 is an A/C converter for converting processed image signals into digital signals.

Indicated at 34 is a memory unit for storing signals picked up at the black reference aperture value, and at 35 a memory unit for storing signals picked up at the white reference aperture value. The memory units 34, 35 include each three memories corresponding to the respective color image signals of R, G, B.

Indicated at 36 is a gradation circuit for applying a gradation correction to the respective color image signals read from the memory unit 34, and at 37 a high luminance gradation circuit for applying a gradation correction to the respective color image signals read from the memory unit 35. The gradation circuit 36 has a gamma characteristic corresponding to the image signal components in the low luminance area (hereinafter referred to as low luminance area signal components), whereas the high luminance gradation circuit 37 has a gamma characteristic corresponding to the image signal components in the high luminance area (hereinafter referred to as high luminance area signal components). As will be described later, the low luminance area signal components of the image signal are read from the memory unit 34 and the high luminance area signal components of the image signal are read from the memory unit 35. To these low and high luminance area signal components is applied a proper gradation correction using the gamma characteristic according to each density characteristic.

Indicated at 38 is a matrix circuit for generating a luminance signal (Y-signal) and color difference signals (R-Y), (B-Y) from the respective color image signals of R, G, B; at 39 an encoder for converting the Y-signal and the color signals (R-Y), (B-Y) into a NTSC signal; and at 40 a D/A converter for converting the NTSC signal into an analog signal.

Indicated at 41 is a Y-matrix circuit for generating the Y-signal from the color image signals read from the memory unit 35, and at 42 a binary processing circuit for converting the Y-signal generated in the Y-matrix circuit 41 into a binary data of "0" or "1".

The binary processing circuit 42 compares the Y-signal with a reference level Vref and converts the Y-signal into "1" when it is higher than the reference level Vref while converting the Y-signal into "0" when it is lower than the reference level Vref.

The binary processing may be such that the Y-signal is converted into "0" when it is higher than the reference level Vref while converted into "1" when it is lower than the reference level Vref.

The reference level Vref is externally changeable through a reference level setting circuit 47. This circuit 47 includes a variable resistor 471 for resistance-dividing a source voltage to set a desired reference voltage Vref and an A/D converter 472 for converting the reference voltage Vref from an analog signal to a digital signal. The digitized reference voltage Vref is input to the binary processing circuit 42.

Indicated at 43 is a labeling circuit for extracting, out of the binary data generated by the binary processing circuit 42, a region constituted by the binary data "1" as a high luminance area and affixing a label to each small section included in the high luminance area so that each small section is identifiable. Indicated at 44 is an image memory for storing the binary data to which the labeling processing has been applied; at 45 a smoothing circuit for correcting the binary data constituting the outline of the small section so that the outline of each small section becomes smooth; at 46 a memory for storing address data for the binary data to which the smoothing processing has been applied.

Indicated at 48 is an address controller for reading the image signal components representing the low luminance area from the memory unit 34; reading the image signal components representing the high luminance area from the memory unit 35; and controlling a combining operation of the images in the low and high luminance areas by combining the image signal components representing these two area.

The address controller 48 reads the binary data from the memory 46. Based on the read binary data, the controller 48 generates address data for the image signal components representing the low luminance area (address data for the image signal components to be read from the memory unit 34) and address data for the image signal components representing the high luminance area (address data for the image signal components to be read from the memory unit 35). The controller 48 reads the desired image signal components from the memory units 34, 35 based on the generated address data.

There will be next described an operation of correcting the quality of image in the luminance balance correction mode of the second photographed image reproducing apparatus.

Figure 4A:
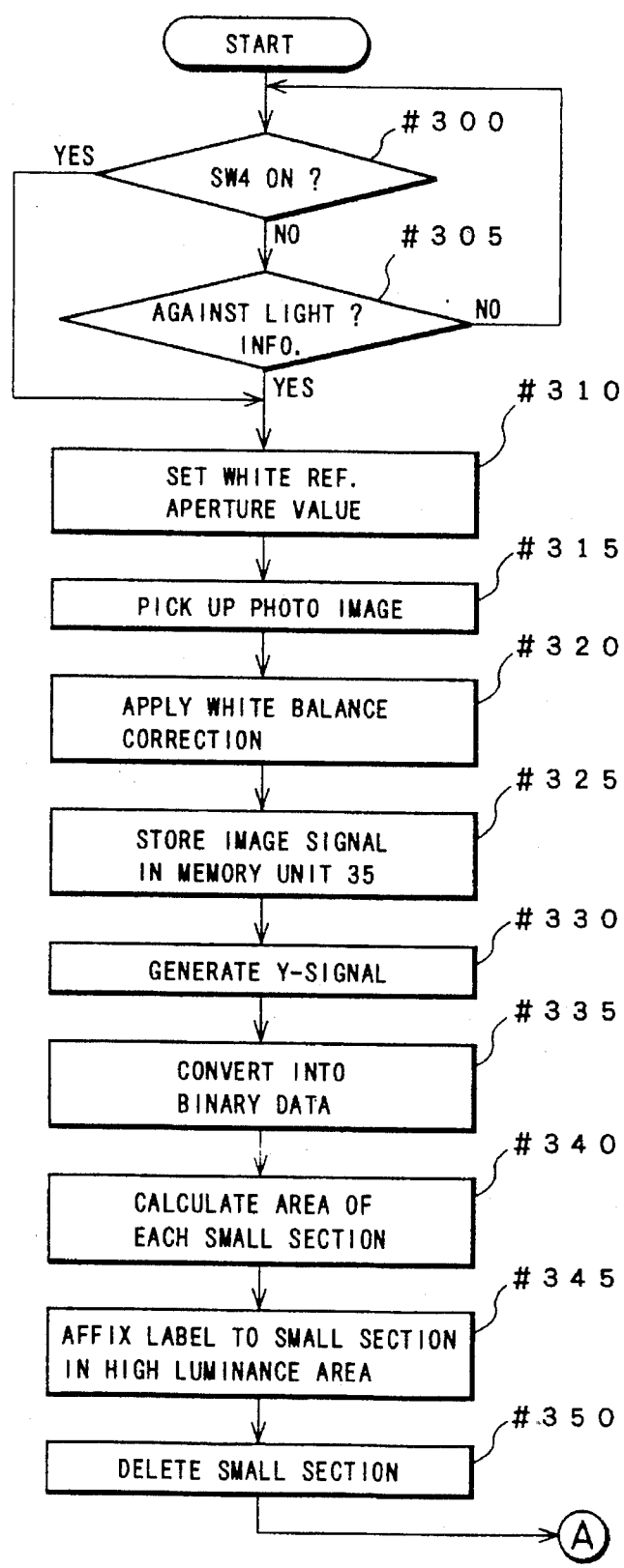
FIGS. 4A and 4B are flow charts showing an image quality correcting operation carried out in the second photographed image reproducing apparatus.
Figure 4B:
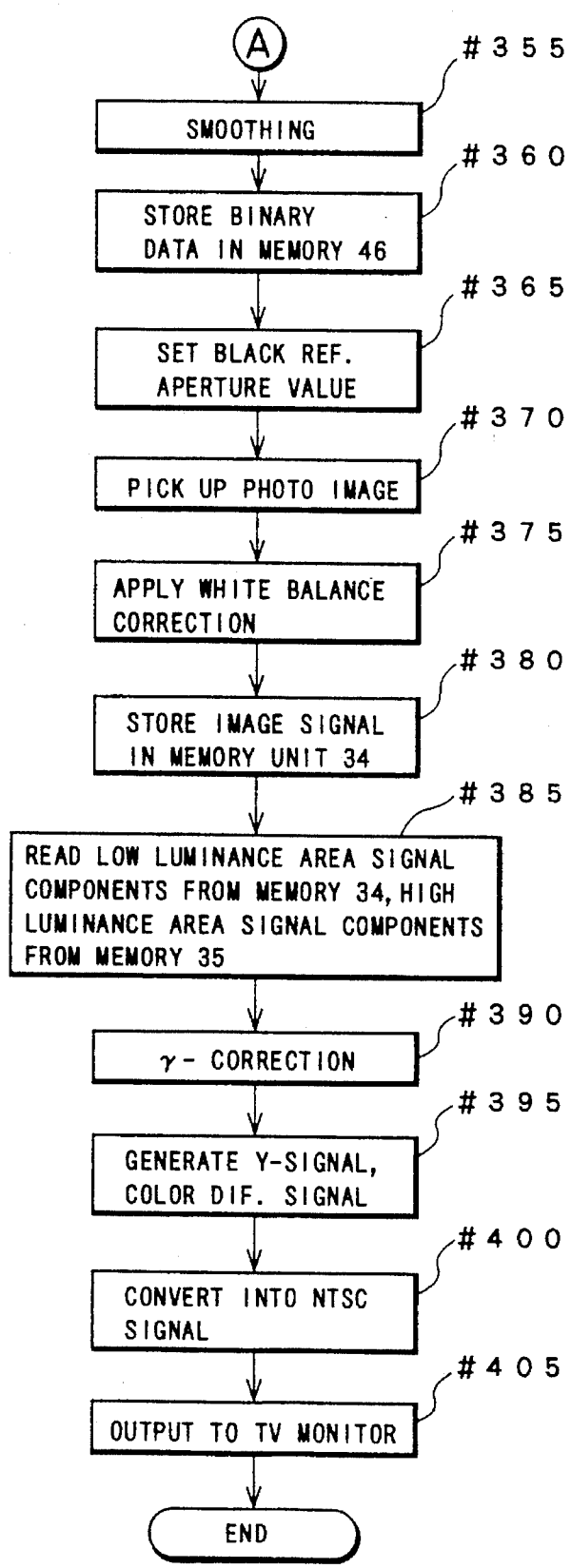

FIGS. 4A and 4B are flow charts showing the image quality correcting operation in the luminance balance correction mode.

First of all, the CPU 30 discriminates whether the switch SW4 is on (Step #300). If the switch SW4 is on (YES in Step #300), this routine proceeds to Step #310 to perform the image quality correcting operation in the luminance balance correction mode.

If the switch SW4 is off (NO in Step #300), it is further discriminated whether the photographing data include an information concerning the photographing operation in a back light condition (hereinafter referred to as an against-the-light information) (Step #305). If this information is not included, this routine returns to Step #300. On the contrary, if this information is included, this routine proceeds to Step #310 to perform the image quality correcting operation in the luminance balance correction mode.

More specifically, if the photographing data include the against-the-light information or the operator has operated the switch SW4 to set the luminance balance correction mode, the image quality correcting operation is performed.

Subsequently, the CPU 30 sets the aperture value of the diaphragm 11 at the white reference aperture value through the white reference exposure control circuit 311 (Step #310), and then causes the photographed image to be picked up (Step #315). The image signal is separated into color image signals of R, G, B, which are sent to the noise suppressing circuit 15. After having reset noises and sampling noises suppressed in the noise suppressing circuit 15 and having a specified signal processing such as a white balance correction applied thereto in the processing circuit 32 (Step #320), these signals are stored temporarily in the memory unit 35 (Step #325).

If the photographed image picked up in Step #315 is of the type, for example, as shown in FIG. 5, the aperture value of the diaphragm 11 is controlled so that the high luminance area can be exposed properly. Accordingly, in the reproduced image of the image signal stored in the memory unit 35 in Step #325, the background image area P1 exhibits a proper luminance and the main subject area P2 looks as if it were photographed while setting an exposure control range lower than an exposure control range suitable for the sensitivity of the film.

Subsequently, the image signal is read from the memory unit 35 to the Y-matrix circuit 41 in which a Y-signal is generated (Step #330). This Y-signal is converted into a binary data in the binary processing circuit (Step #335). Then in the labeling circuit 43, a high luminance area is extracted; a label is affixed to each small section included in the high luminance area: and an area of each small section is calculated (Step #340).

Based on the calculated areas, the labeling circuit 43 deletes the small section(s) having an area smaller than a predetermined value (Step #350). If the small sections having the very small area are extracted as parts of the high luminance area, it becomes complicated to combine the images in the low and high luminance areas. The operation of Step #350 is made to avoid this complication. The binary data to which the labeling processing has been applied is stored in the image memory 44.

Figure 8:
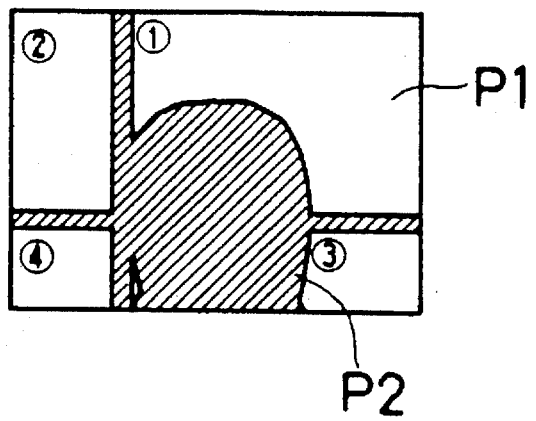
FIG. 8 is a diagram showing an image obtained when a image signal is binary processed.

FIG. 8 is a diagram showing an example of a binary image obtained by converting the image signal representing the image shown in FIG. 6 into a binary data. A white portion represents an image in the high luminance area and an oblique lined portion represents an image in the low luminance area. Since the white portion is divided into four small sections ① to ④ within a screen, labels are affixed to the respective small sections ① to ④ and areas thereof are calculated in Step #340. Since each one of the small sections ① to ④ has a relatively large area, it is determined to extract all the four small sections as parts of the high luminance area.

After the smoothing processing is applied to the respective small sections in the smoothing circuit 45 so as to make the outlines thereof smooth (Step #355), the binary data is stored in the memory 46 (Step #360).

Subsequently, the CPU 30 sets the aperture value of the diaphragm 11 at the black reference aperture value through the black reference exposure control circuit 312 (Step #365), and then causes the photographed image to be picked up (Step #370). The image signal is stored temporarily in the memory unit 34 (Step #380) after the signal processing similar to the one performed in Step #320 is applied thereto (Step #375).

In the reproduced image of the signal picked up in Step #370 and stored in the memory unit 34 in Step #380, the main subject image area P2 exhibits a proper luminance as shown in FIG. 7 and the background image area P1 looks as if it were photographed while setting the exposure control range higher than an exposure control range suitable for the sensitivity of the film. This is because the aperture value of the diaphragm 11 is controlled so that the low luminance area is exposed properly in the second image pick-up operation.

In Step #385, the address controller 48 reads the binary data from the memory 46; reads, based on the binary data, the image signal components (low luminance area signal components) included in the low luminance area (an oblique lined portion in FIG. 8) from the memory unit 34 and the image signal components (high luminance area signal components) included in the high luminance area (white portions ① to ④); and combines the picked up images in the both areas.

The gradation correction is applied to the low and high luminance area signal components respectively in the gradation correcting circuit 36 and the high luminance correcting circuit 37 (Step #390). Based on these signal components, a Y-signal and color difference signals (R-Y), (B-Y) are generated in the matrix circuit 38 (Step #395). In Step #400, thus generated signals are converted into a NTSC signal, which is in turn converted into an analog signal in the D/A converter 40 and then output to an unillustrated TV monitor (Step #405).

Figure 9:
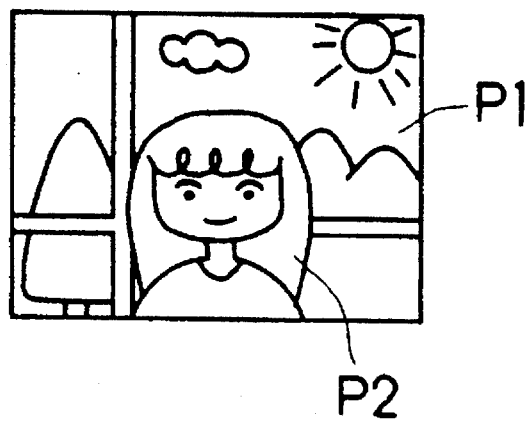
FIG. 9 is a diagram showing a reproduced image when the image signal is corrected in a luminance balance correction mode.

FIG. 9 is a diagram showing a reproduced image when the image signal is corrected in the luminance balance correction mode. On the TV monitor is displayed, as shown in this figure, an image obtained by combining the background image area P1 shown in FIG. 6 and the main subject image portion P2 shown in FIG. 7.

As described above, in the second embodiment, the photographed image having a large luminance difference is picked up twice: the one by adjusting the exposure with respect to the low luminance area and the other by adjusting the exposure with respect to the high luminance area. Signal components in the low and high luminance areas are extracted from these two image signals and then combined. Thus combined signal is reproduced on the TV monitor. Accordingly, the reproduced image is allowed to have a suitable luminance balance.

In the second embodiment, the photographed image is picked up twice in accordance with the exposure control values corresponding to the high and low luminance areas P1 and P2, and the images in the high and low luminance areas are extracted from the respective picked up images to be combined. However, it may be also possible to pick up the photographed image only once and to apply the gradation correction to the images in the high and low luminance areas of the picked up image using different gamma characteristics.

In this case, if the images P1, P2 in the high and low luminance areas after the gradation correction are combined directly, a gradation characteristic of a boundary portion of the two images becomes discontinuous. Thus, the combined image looks unnatural, giving a viewer the impression as if the two images P1, P2 were fitted together on the same plane.

Figure 10A:
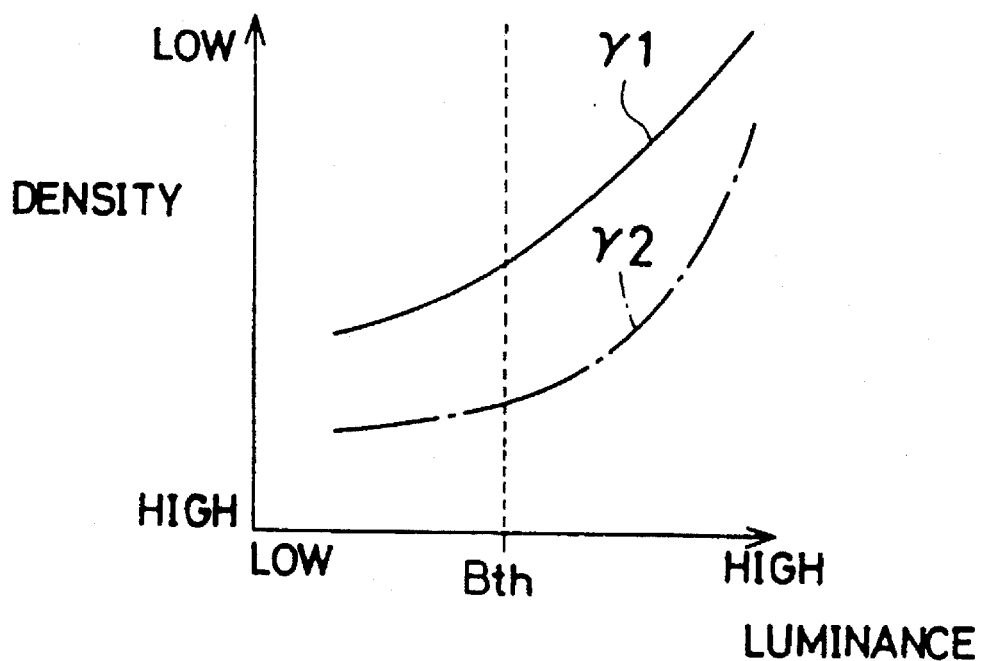
FIG. 10A is a graph showing two exemplary gamma characteristics used for high and low luminance images.
Figure 10B:
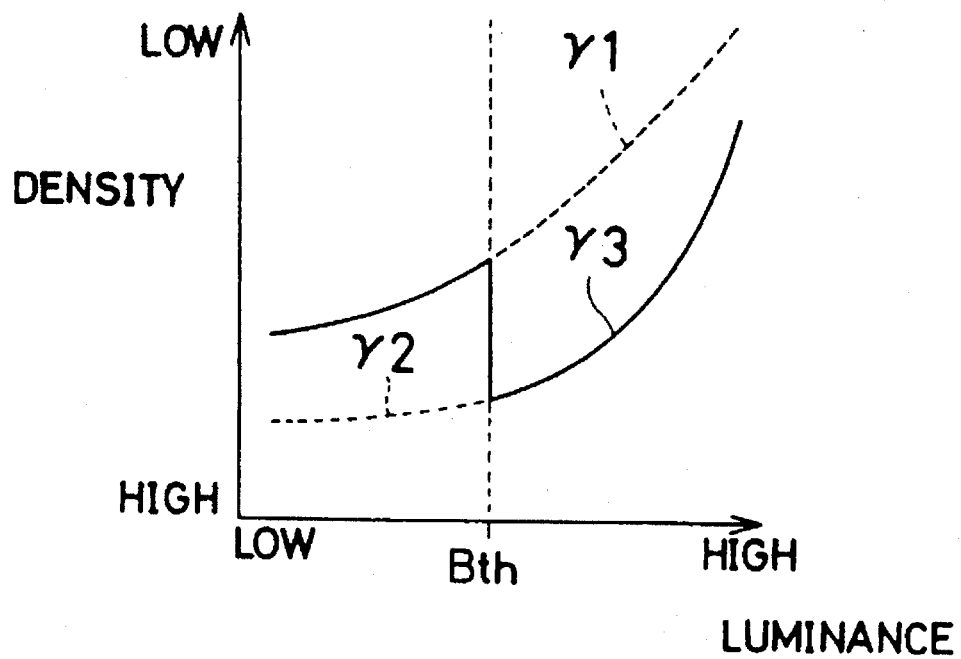
FIG. 10B is a graph showing a combined gamma characteristic obtained by combining the gamma characteristic for the high luminance image with the one for the low luminance image.
Figure 13A:
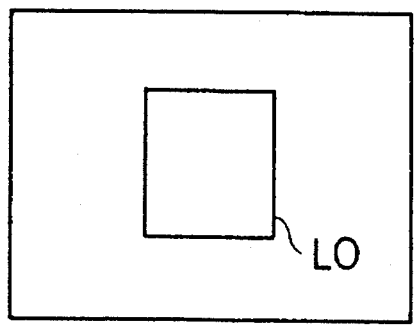
FIGS. 13A to 13E are diagrams showing a process of extracting boundary image signal components.

Let is be assumed that two kinds of different gamma characteristics γ1, γ2, for example, as shown in FIG. 13A are used and that the gamma characteristic γ1 is used in the low luminance area where the luminance of the subject is lower than a threshold level Bth while the gamma characteristic γ2 is used for the high luminance area where the luminance of the subject is higher than the level Bth. Then, the gamma characteristic for the combined image shows discontinuity at the threshold level Bth as indicated by γ3 in FIG. 10B.

Figure 11:
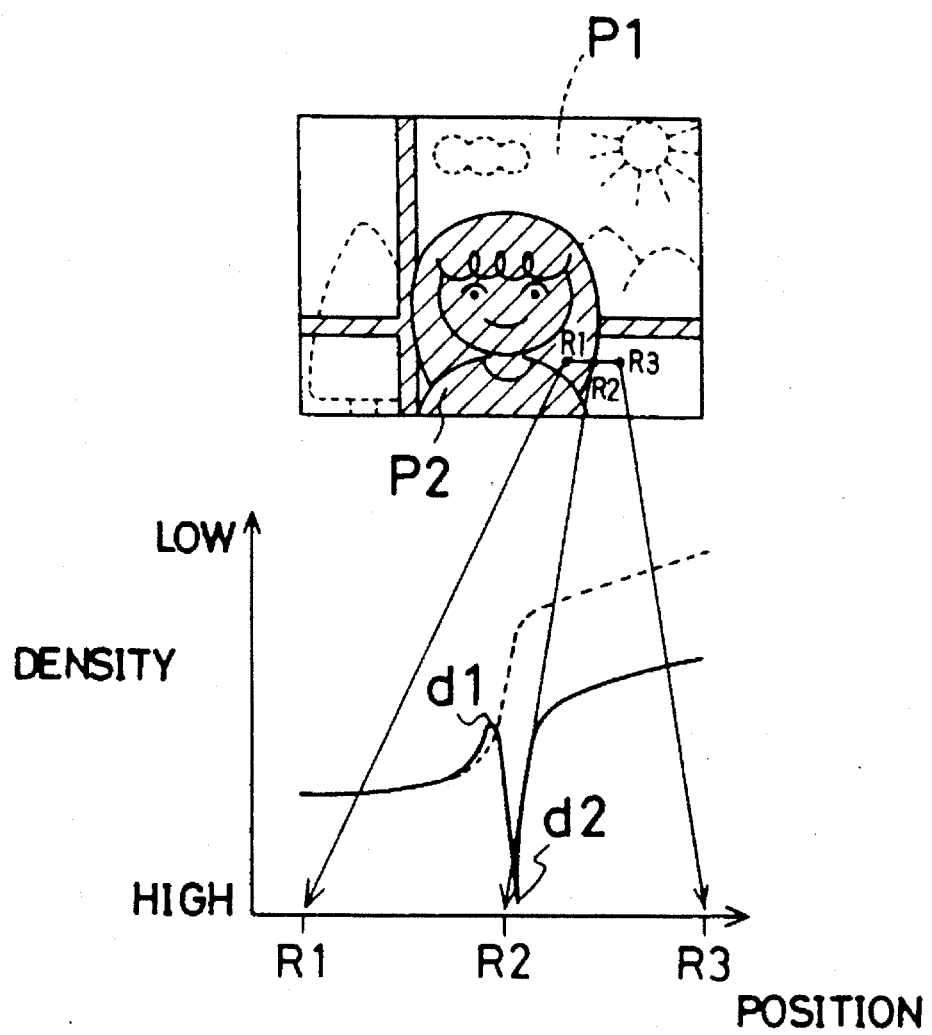
FIG. 11 is a graphical representation showing a density characteristic of a boundary portion between high and low luminance regions in a combined image.

Accordingly, when the gradation correction is applied to the photographed image shown in FIG. 5 using the gamma characteristic γ1, the density of its reproduced image changes continuously, for example, as shown by dotted line in FIG. 11. On the other hand, when the gradation correction is applied to the background image areas P1 and the main subject image area P2 in FIG. 5 using the gamma characteristics γ1, γ2 and the resulting images are combined, the density characteristic of this combined image shows discontinuity at a boundary portion R2 between the background image area P1 and the main subject image area P2. In this case, when the density difference at the discontinuous portion is large, a black or white quasi-boundary line appears in areas corresponding to points of discontinuity d1 or d2 of the density characteristic, leading to a reduced image quality which is peculiar Lo an image combining processing.

There will be described a third photographed image reproducing apparatus which is capable of smoothing the density variation in a boundary area between high and low luminance areas and reproducing a natural-looking combined image.

Figure 12A:
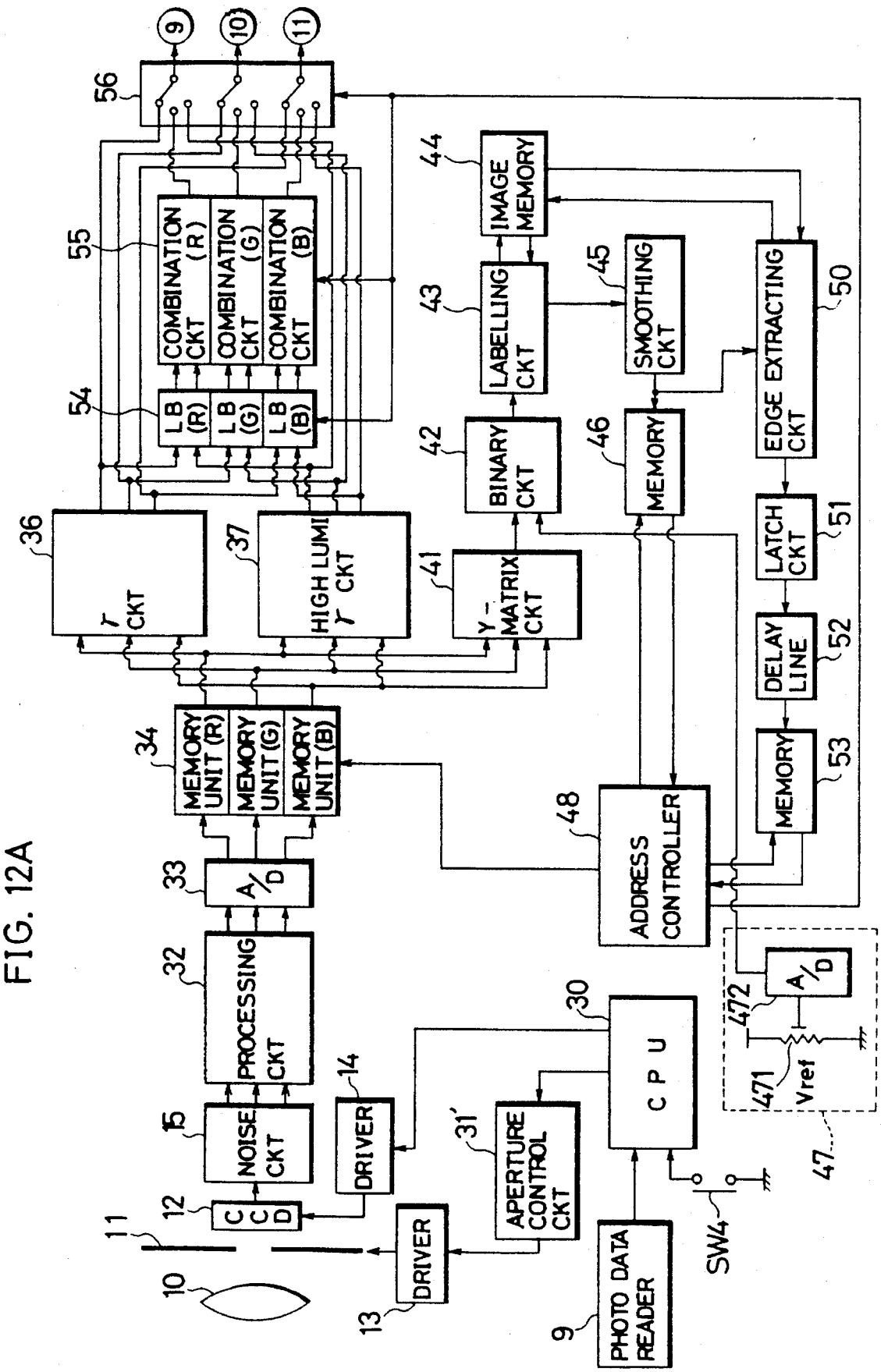
FIGS. 12A and 12B are block diagrams showing a construction of a third photographed image reproducing apparatus according to the invention.
Figure 12B:
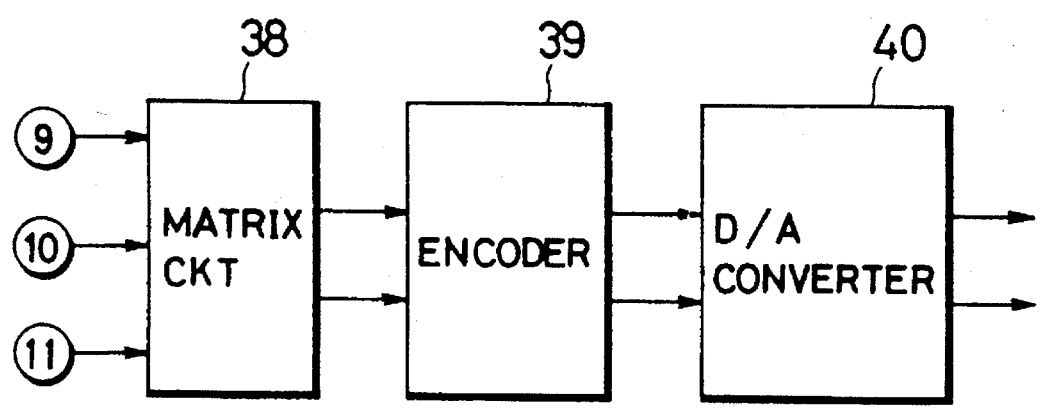

FIGS. 12A and 12B are block diagrams showing the construction of the third photographed image reproducing apparatus according to the invention.

The third embodiment differs from the second embodiment in that:

the aperture control circuit 31 is replaced with an aperture control circuit 31' including only a black reference exposure control circuit;

the memory 35 is removed from the construction;

an edge extracting circuit 50, a latch circuit 51, a delay line 52 and a memory 53 used for processing an outline are arranged in this order between the smoothing circuit 45 and the address controller 48; and line buffer (LB) 54, a combination processing circuit 55 and a switch circuit 56 are arranged in this order between the gradation circuits 36, 37 and the matrix circuit 38.

The edge extracting circuit 50, the latch circuit 51, the delay line 52 and the memory 53 are provided to extract image signal components representing the vicinity of a boundary line between low and high luminance areas in a photographed image as those representing a boundary area.

More specifically, the image signal components representing a boundary line between the high and low luminance areas (hereinafter referred to as boundary image signal components) are extracted by the edge extracting circuit 50. Thereafter, these boundary image signal components are shifted horizontally by a specified number of pixels by the latch circuit 51 while being shifted vertically by a specified numbers of pixels by the delay line 52. In this way, image signal components representing the vicinity of the boundary line are extracted also as boundary image signal components.

Figure 13B:
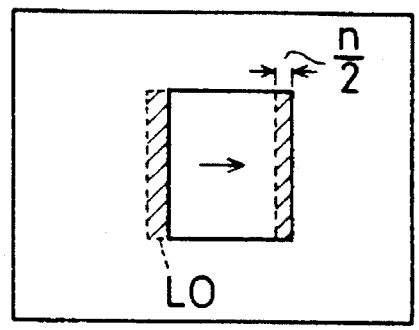
Figure 13D:
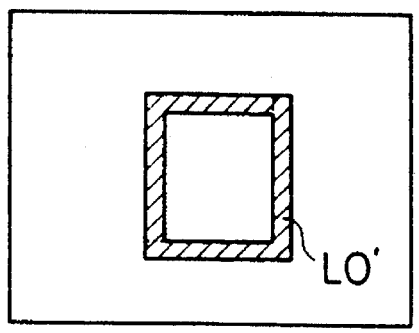
Figure 13C:
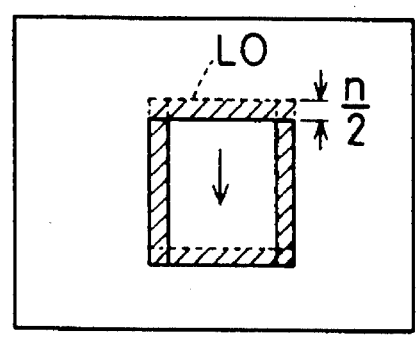

Let it be assumed, for example, that a boundary line extracted based on a binary data by the edge extracting circuit 50 forms a rectangle L0 shown in FIG. 13A. After being shifted horizontally to the right altogether by n/2 pixels (see FIG. 13B), the binary data is shifted vertically downward altogether by n/2 pixels (see FIG. 13C). In this way, there can be generated a wider boundary line L0' having the width of n/2. The image signal components representing this boundary line L0' (image signal components representing an oblique lined portion in FIG. 13D) are extracted as boundary image signal components.

Figure 13E:
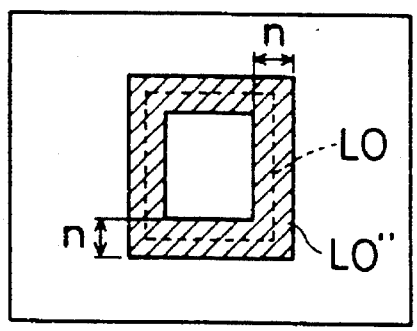

With the method for widening the boundary line L0 using the latch circuit 51 and the delay line 52, the boundary line L0 is not located at the center of the boundary line L0'. Thus, it is preferable to treat image signal components representing a region defined by the boundary line and lines spaced therefrom horizontally to the left and vertically upward by n/2 pixels as boundary image signal components and to correct the boundary image signal components so that the boundary line L0 is located at the center of the boundary line L0" as shown in FIG. 13E.

The combination processing circuit 55 changes a gradation characteristic of the boundary image signal components into a smoother one so as to moderate a sudden change in the density in the boundary area. This circuit 55 includes three processing circuits having the identical construction. These processing circuits change the gradation characteristic of the boundary image signal components with respect to three color image signals of R, G, B.

The combination processing circuit 55 is controlled in accordance with a control signal from the address controller 48, and smooths the density characteristic of the image in the boundary area by causing the boundary image signal components input from the gradation circuits 36, 37 to pass through a built-in low pass filter (LPF). A process to smooth the density characteristic is not limited to the one using the LPF. A median filter may be used, or an averaging processing may be carried out to average the image signal.

The line buffer 54 is adapted to regulate a speed at which the boundary image signal components are read to the combination processing circuit 55 in relation to a speed at which these signal components are processed.

The switch 56 controllably switches the output of the image signal components in the low luminance area, boundary area and high luminance area from the gradation circuits 36, 37 and the combination processing circuit 55 to the matrix circuit 38, thereby generating a combined image. The switching operation of this circuit 56 is controlled in accordance with a control signal from the address controller 48.

Figure 14A:
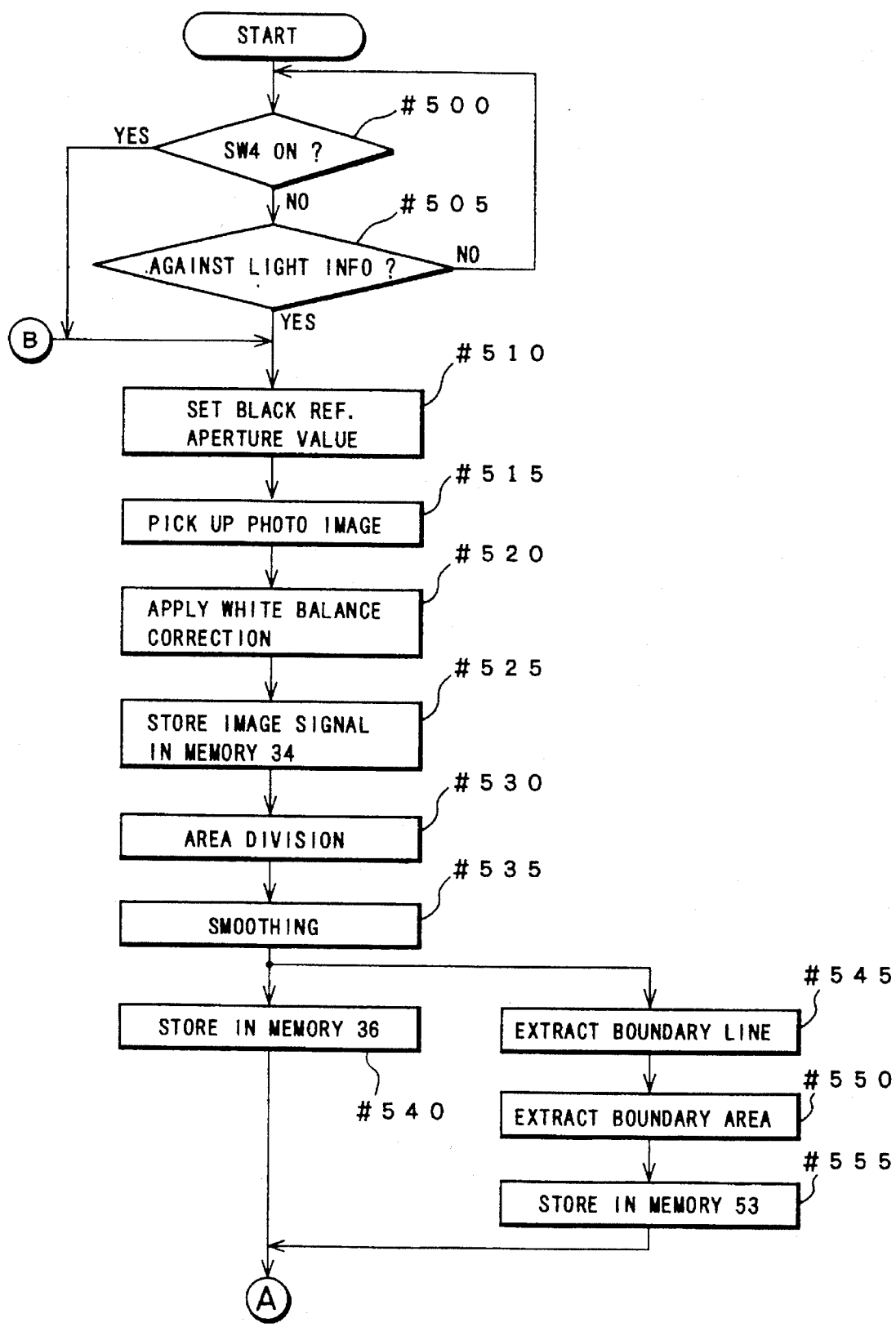
FIGS. 14A and 14B are flow charts showing an image quality correcting operation carried out in the third photographed image reproducing apparatus.
Figure 14B:
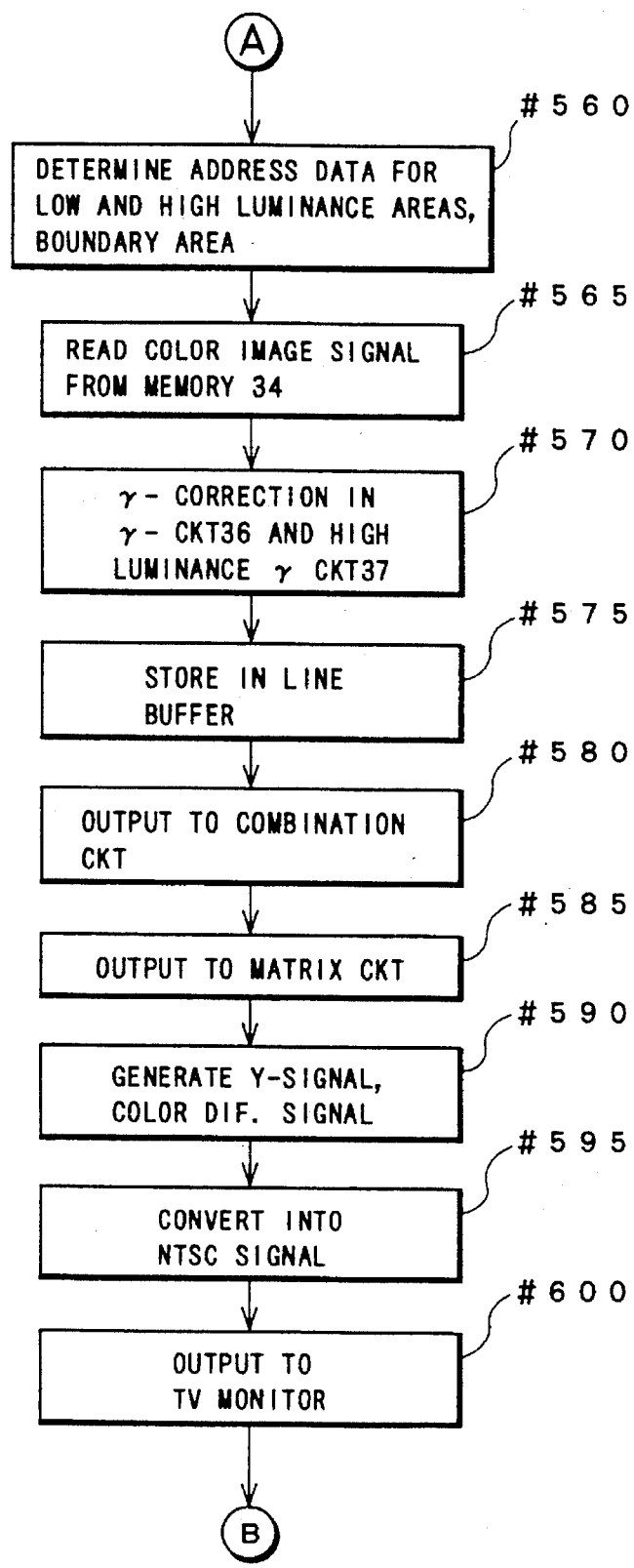

There will be described a reproducing operation of the third photographed image reproducing apparatus next with reference to a flow chart shown in FIGS. 14A and 14B.

First of all, the CPU 30 discriminates whether the switch SW4 is on (Step #500). If the switch SW4 is on (YES in Step #500), an image quality correcting operation is performed in the luminance balance correction mode (Step #510).

The CPU 30 then causes a photographed image to be picked up (Step #515) after setting an aperture value of the diaphragm 11 at a black reference aperture value through the aperture control circuit 31' (Step #510). This picked-up signal (image signal) is separated into three color image signals of R, G, B. The reset noises and sampling noises of these color image signals are suppressed in the noise suppressing circuit 15 and a specified signal processing such as a white balance correction is applied thereto in the processing circuit 32 (Step #520). The resulting signals are stored in the memory unit 34 (Step #525).

In Step #530, the color image signals stored in the memory unit 34 are immediately read to the Y-matrix circuit 41, and are divided into two types binary data representing the high and low luminance areas through the Y-matrix circuit 42, the binary processing circuit 42 and the labeling circuit 43. Thus divided binary data are stored in the image memory 44 (Step #530). No description will be given on a processing of dividing signal components into those representing the high and low areas, because it is similar to the one performed in Steps #330 to #360 of FIGS. 4A and 4B.

A reference level Vref used in the binary processing by the binary processing circuit 42 is a partial potential level set suitably in an adjusting state of the variable resistor 471 when the photographed image is picked up. The reference level Vref is changed when an operator viewing a reproduced image displayed on the TV monitor adjusts the variable resistor 471 to be described later. By changing the reference level Vref, the image quality of the reproduced combined image is adjusted.

The binary data are stored in the memory 46 (Step #540), after a smoothing processing is applied to the binary data representing the high luminance area in the smoothing circuit 45 so as to smooth the outlines (Step #535).

The boundary line between the high and low luminance areas is extracted from the binary data, to which the smoothing processing is applied, by the edge extracting circuit 50 (Step #545). The boundary line is extracted through an outline tracking operation in which an outline is tracked by checking eight connected binary data.

Let it be assumed that the image data after the binary processing are arranged, for example, in matrix as shown in FIG. 15A. The image data is raster scanned from a binary data located at an upper left corner to the one located at a lower right corner to detect a tracking start point for the outline tracking. Subsequently, eight binary data enclosing the tracking start point are scanned clockwise or counterclockwise as shown in FIGS. 15B, 15C and a first detected boundary point (binary data of "1") is used a tracking point (first tracking point) for tracking a next boundary line.

A next tracking point (second tracking point) is detected from this first tracking point through the same method which was used to detect the first tracking point from the tracking start point. Subsequently, each time a p-th tracking point is detected, a (p+1)th tracking point is detected using the same method. At the time when a n-th tracking point coincides with the tracking start point, a line connecting the tracking start point (n-th tracking point), the first tracking point, the second tracking point, . . . , the (n−1)th tracking point is extracted as a boundary line.

The binary data are shifted horizontally to the right by, e.g., n/2 pixels by the latch circuit 51 while being shifted vertically downward by, e.g., n/2 pixels by the delay line 52, thereby widening the boundary line. In this way, there are generated image data set as boundary image signal components from the binary data located in the widened boundary line (see FIGS. 13B, 13C) and this image data are stored in the memory 53 (Steps #550, #555).

The address controller 48 reads the image data set as the boundary image signal components from the memory 53 and generates address data for a boundary area from the address data corresponding to the boundary image signal components. More specifically, there are calculated the address data for the binary data included in the region defined by the boundary line extracted by the edge extracting circuit 50 and lines spaced therefrom horizontally to the left and vertically upward by n/2 pixels. This address data and the address data corresponding to the boundary image signal components are determined as address data for the boundary area. The above calculation of the address data intends to correct the boundary image signal components, so that the detected boundary line is located at the center of a boundary area (see FIG. 13E).

The address controller 48 reads the binary data from the memory 46; generates address data for the low and high luminance areas based on the read binary data; and subtracts the address data for the boundary area from thus generated address data to determine address data for low and high luminance areas to be combined (hereinafter referred to as low and high luminance combination areas respectively) in Step #560.

FIG. 16 a diagram showing a state where a photographed image is divided into low and high luminance combination areas and a boundary area.

In this figure, A1, A2, A3 denote a high luminance combination area, a boundary area and a low luminance combination area respectively. Indicated at L0 is a center line of the boundary area (boundary center) which is extracted by the edge extracting circuit 50. An area outside the boundary center L0 is the high luminance area and an area inside the boundary center is the low luminance area. These luminance areas are extracted by the labeling circuit 43 and the smoothing circuit 45. The address controller 48 determines the address date for the high luminance combination area A1, the boundary area A2 and the low luminance combination area A3.

Subsequently, the address controller 48 reads the color image signals from the memory unit 34 (Step #565). The read color image signals are input to the gradation circuits 36, 37. The gradation correction is applied to the color image signals using the gamma characteristic γ1 for the low luminance in gradation circuit 36 and using the gamma characteristic γ2 for the high luminance in high luminance gradation circuit 37 (Step #570). The color image signals having the gradation correction applied thereto in the gradation circuits 36, 37 are sent to the switch circuit 56 and also to the line buffer 54 to be stored there in (Step #575).

The color image signals stored the line buffer 54 are read sequentially in accordance with a control signal from the address controller 48 to the combination processing circuit 55, in which the gradation characteristic in the boundary area is corrected so that the density changes continuously between the low and high luminance areas (Step #580). Thus corrected color image signals are input to the switch circuit 56.

The image signals input to the switch circuit 56, including those having being converted using the gamma characteristics γ1 and γ2 and the one to which components in the boundary area to which the gradation correction is applied, are output switchingly to the matrix circuit 38 in accordance with a control signal from the address controller 48 in correspondence with a reading area of the image signal in the memory unit 34 (Step #585).

More specifically, when the reading area is the low luminance combination area, the image signal having being converted using the gamma characteristic γ1 is output. When the reading area is the high luminance combination area, the image signal having being converted using the gamma characteristic γ2 is output. When the reading area is the boundary area, the image signal to which component in the boundary area the gradation correction is applied is output. In this way, there can be generated a combined image signal in which the respective areas are combined.

Figure 17:
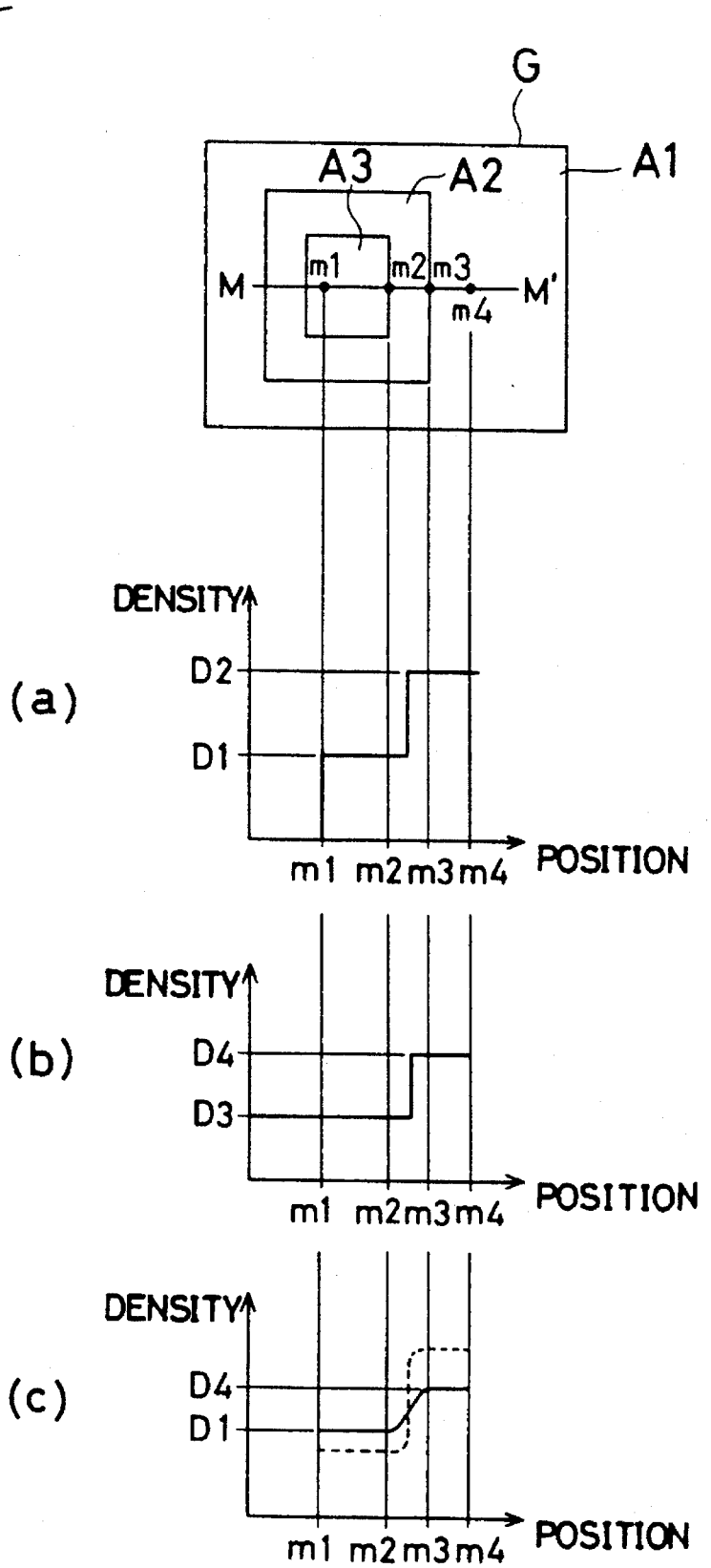
FIG. 17 show a density characteristic of each area of a combined image and that of an overall combined image, (a) being a graph showing a density characteristic of an image signal output from a gradation circuit, (b) a graph showing a density characteristic of an image signal output from a high luminance gradation circuit and (c) a graph showing a density characteristic of a combined image signal.

FIG. 17 is a diagram showing the density characteristic of the respective areas of the combined image and that of the overall combined image.

In this figure, indicated at G is a diagram showing a photographed image and at (a) to (c) graphs showing the density characteristics of the image signal on a line M—M' indicated in the photographed image after the γ-conversion, the combination processing and the combination. In other words, graph (a) shows the density characteristic of the image signal output from the gradation circuit 36; graph (b) that of the image signal output from the high luminance gradation circuit 37; graph (c) that of the image signal after the combination.

Let it be assumed that the image signal components located between m1 and m4 on the line M—M' are read from the memory unit 34. To the matrix circuit 38 is output, through the switch circuit 56, the image signal components from the gradation circuit 36 in a section between m1 and m2; the image signal components from the combination processing circuit 55 in a section between m2 and m3; and the image signal components from the high luminance gradation circuit 37 in a section between m3 and m4.

Accordingly, as shown in graph (c), the density characteristic of the image signal after the combination is such that the density characteristics shown in graphs (a), (b) are combined in the corresponding sections. Thus, the density characteristic in the boundary area changes continuously.

Subsequently, a Y-signal and color difference signals (R-Y), (B-Y) are generated in the matrix circuit 38 (Step #590) and these signals are converted into a NTSC signal by the encoder 39 (Step #595). Thus obtained NTSC signal is converted into an analog signal by the D/A converter 40 to be output to an unillustrated TV monitor (Step #600).

After the image signal representing one frame of image is reproduced, this routine returns to Step #510. Thereafter, the photographed image is picked up and is output to the TV monitor after the combination processing similar to the above is carried out. Photographed images are picked up in a specified cycle and the combined images obtained by applying the combination processing to the picked up images are reproduced one after another on the TV monitor.

The combined image represented by the image signal input to the matrix circuit 38 has a density characteristic which is continuous in the boundary area A2. Accordingly, the image density in the boundary portion does not change unnaturally and no quasi-boundary line appears in the reproduced combined image.

In the image quality correcting operation of the photographed image reproducing apparatus, the operator is allowed to adjust the high luminance area (or low luminance area) of the combined image manually by adjusting the variable resistor 471 while viewing the combined image reproduced on the TV monitor. More specifically, when a set value of the reference level Vref is changed through the variable resistor 471, the binary processing is performed based on the reference level Vref after the adjustment during the combining operation of the picked up image (Step #530). This causes the boundary line extracted by the edge extracting circuit 50, i.e., the boundary center to change.

Further, if the characteristic of the LPF provided in the combination processing circuit 55 and the shift amounts of the latch circuit 51 and the delay line 52 are made manually adjustable, the size of the boundary area and the correction level of the gradation characteristic in the boundary area become changeable. Thus, the density characteristic of the boundary portion in the combined image can be adjusted finely manually so that the boundary portion looks more natural.

Figure 18:
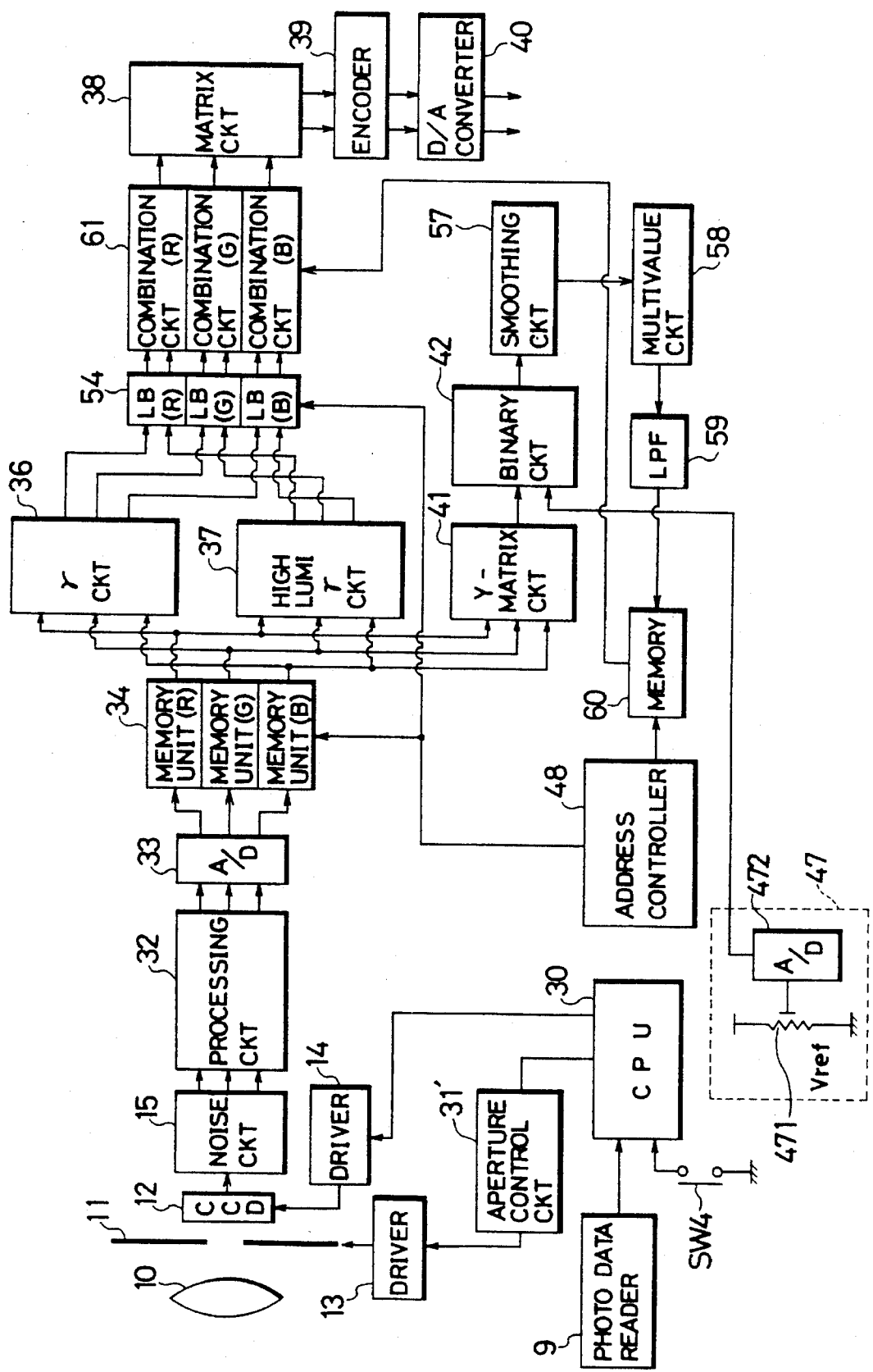
FIG. 18 is a block diagram showing a construction of a fourth photographed image reproducing apparatus according to the invention.

FIG. 18 is a block diagram showing the construction of a fourth photographed image reproducing apparatus according to the invention.

This fourth embodiment is a modification of the third embodiment. In the third embodiment, three different image signals are obtained from the same image signal by converting it using three different gamma characteristics corresponding to the high luminance area, the low luminance area and the boundary area, and thus obtained image signals are switchably output by the switch circuit 56 to generate a combined image signal. However, in the fourth embodiment, the image signal components read from the memory unit 34 are converted using a suitable one of three different gamma characteristics, each corresponding to the high luminance, low luminance, and boundary areas, in accordance with the reading area. In this manner, the effects similar to those of the third embodiment are obtained.

The fourth embodiment is identical to the third embodiment except that:

a smoothing circuit 57, a multivalue processing circuit 58, a low pass filter (LPF) 59 and a memory 60 are provided in place of the labeling circuit 43, the image memory 44, the smoothing circuit 45, the memory 46, the edge extracting circuit 50, the latch circuit 51, the delay line 52 and the memory 53; and a combination processing circuit 61 is provided in place of the combination processing circuit 51.

The smoothing circuit 57, the multivalue processing circuit 58 and the LPF 59 are provided to generate a control data for a combination processing (hereinafter reference to a combination control data) carried out in the combination processing circuit 61. The circuit 57 smooths a signal carrying a sequence of binary data of "0" or "1" (hereafter expressed as binary data (0,1)) generated in a binary processing circuit 42 to remove unnecessary components such as a flyback-time. The circuit 58 converts the respective binary data (0,1) into multivalue data consisting of n (>2) bits of "0" to "2+e,cir +ee n-1" (hereinafter expressed as multivalue data (2+e,cir +ee n-1)). It will be appreciated that "2+e,cir +ee n" reads 2 to the n-th power. The LPF 59 removes high frequency components from the signal carrying a sequence of multivalue data, thereby making this signal have a sloped rise.

The multivalue data carried by the signal having the sloped rise are stored as combination control data in the memory 60, and are read to the combination processing circuit 61 in synchronism with the reading of the image signal from a memory unit 34. An address controller 48 sends address data to the memory unit 34 and the memory 60, thereby controlling the reading of the image signal from the memory unit 34 and the combination processing in the combination processing circuit 61.

Figure 19:
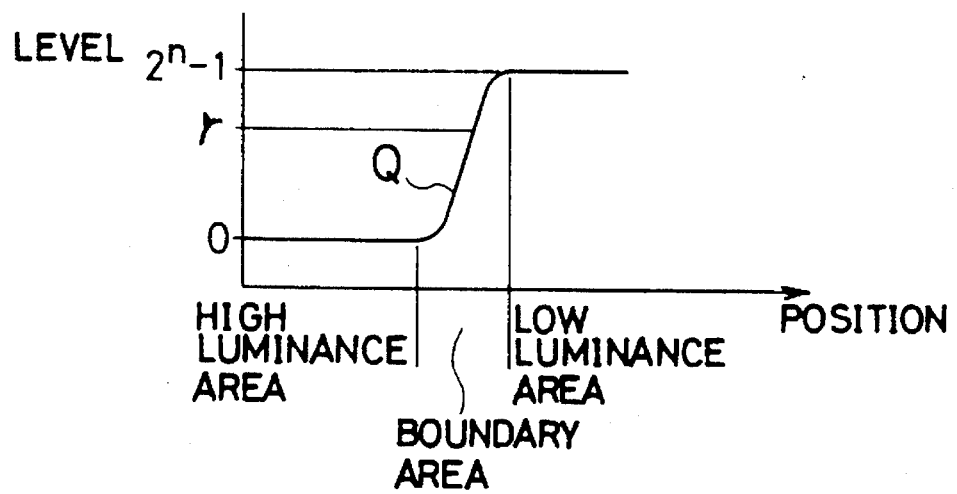
FIG. 19 is a chart showing a waveform of a combination control data.

FIG. 19 is a chart showing a waveform of the combination control data.

In FIG. 19, a region of level (0) corresponds to a high luminance area and a region of level (2+e,cir +ee n-1) corresponds to a low luminance area. A rise portion Q which is caused to slop by the LPF 59 has a level of r corresponds to a boundary area to be described later (where 0<r<2+e,cir +ee n-1).

The combination processing circuit 61 combines the image signal components from a gradation circuit 36 (low luminance area signal components) and the image signal components from a high luminance gradation circuit 37 (high luminance area signal components) in accordance with the following equation (1) using the combination control data.

EQUATION 1

Combined signal=$(1-K) \times$(high luminance signal components)+$K \times$ (low luminance signal components)

where K is a combining factor and expressed:

$$K = r/(2^n-1) \text{ where } 0 < r < 2^n-1.$$

As is clear from the equation 1, the combined image consists of the high luminance area signal components in a region where K=0 (the combination control data is "0"), the low luminance area signal components in a region where K=1 (the combination control data is "$2^n-1$"), and signal components obtained by mixing the high and low luminance area signal components at a ratio of K:(1−K) in a region where 0<K<1 (the combination control data is "r").

In view of the γ-convergion, this is equivalent to that:
image signal components in the region where K=0 are converted using a gamma characteristic γ1;
image signal components in the region where K=1 are converted using a gamma characteristic γ2; and
image signal components in the region where 0<K<1 are converted using a gamma characteristic γ4 (=(1−K)×γ1+K×γ2).

Figure 20:
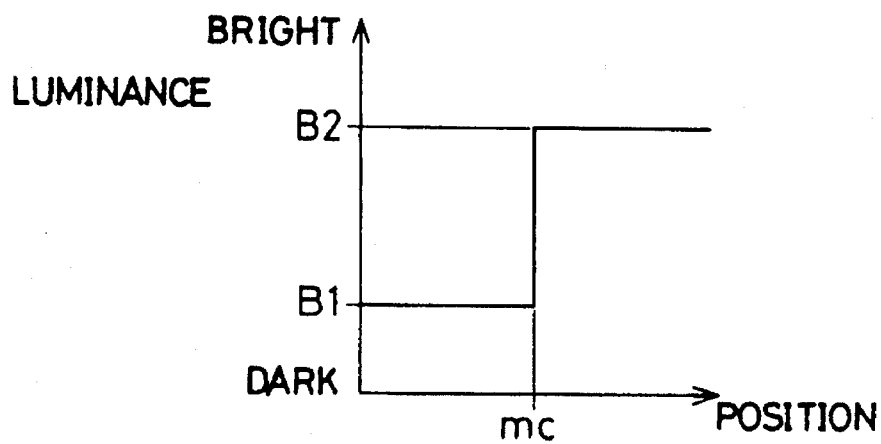
FIG. 20 is a graph showing an exemplary change in the luminance at a boundary portion between the low and high luminance areas.

FIG. 20 is a graph showing an exemplary luminance change at a boundary mc between the low and high luminance areas, and FIG. 20 is a waveform chart showing combining factors K and (1−K) obtained from the combination control data near the boundary mc.

Figure 22:
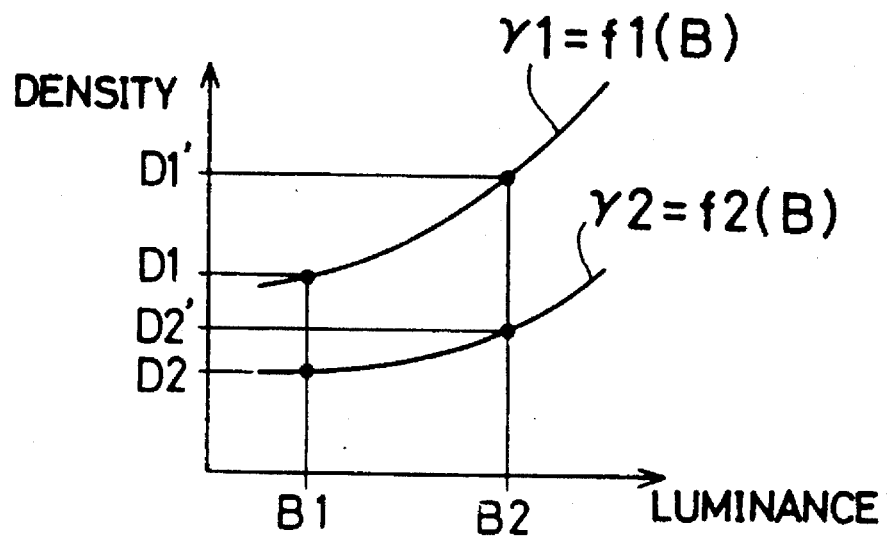
FIG. 22 is a graph showing exemplary low and high luminance gamma characteristics.
Figure 23:
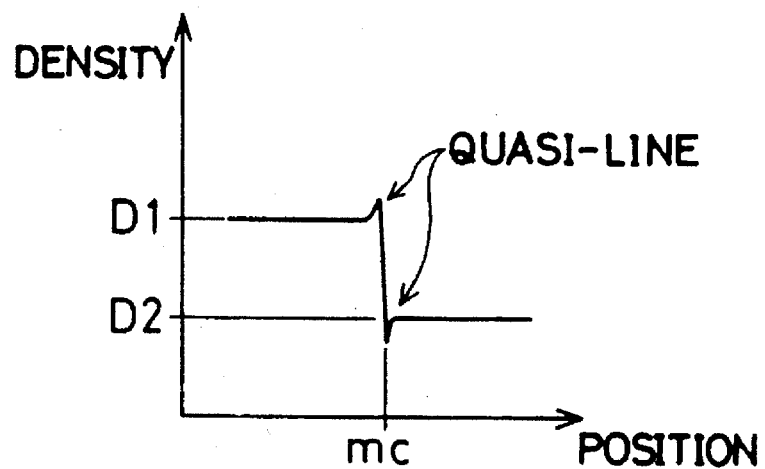
FIG. 23 is a graph showing a density characteristic of the boundary portion when the images in the low and high luminance areas are combined simply.

If the gamma characteristics γ1, γ2 of the gradation circuits 36, 37 are assumed to be as shown in FIG. 22, the density changes suddenly at the boundary mc as shown in FIG. 23 when the low and high luminance area signal components are combined simply, thereby producing a quasi-line at this portion.

Figure 21:
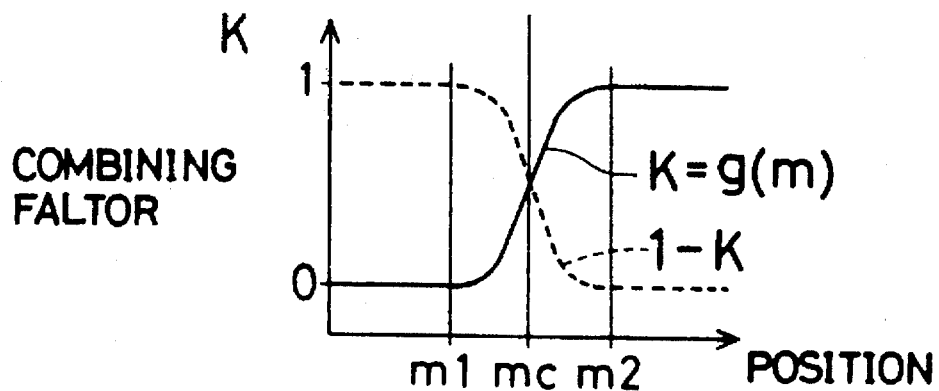
FIG. 21 is a graph showing combination factors K, (1−K) obtained from the combination control data in the vicinity of the boundary.

However, if the low and high luminance signal components are combined in accordance with the combination control data, the gamma characteristic γ4 near the boundary mc: γ4(B)=(1−K)×f1(B)+K×f2(B), is defined as follows from FIGS. 21, 22, (1) m1<m<mc D=(1−K)×D1+K×K2'

(2) mc<m<m2 D=(1−K)×D1'+K×D2.

Figure 24:
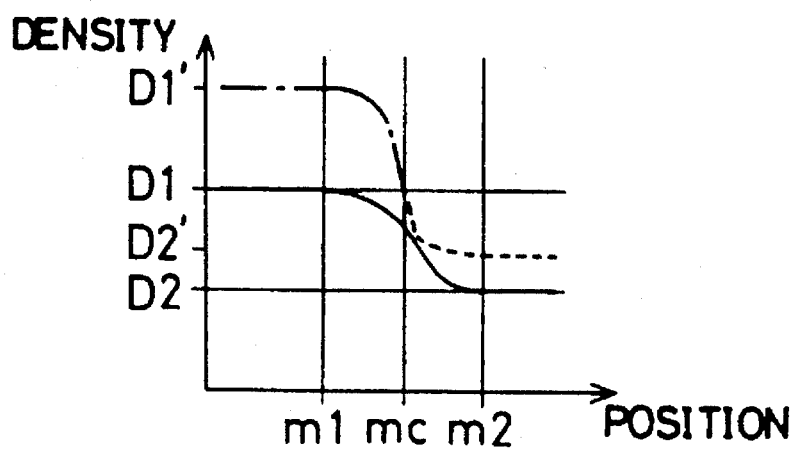
FIG. 24 is a graph showing a density characteristic of the boundary portion when the images in the low and high luminance areas are combined in accordance with the combination control data.

Accordingly, as shown in FIG. 24, a boundary area is formed in a section between m1 and m2, the boundary mc being located substantially in the middle of the section. The density changes smoothly in the boundary area.

Since the density changes continuously and smoothly at the boundary between the low and high luminance areas, no quasi-line will appear on this boundary and the reproduced combined image will look as natural as possible.

Figure 25A:
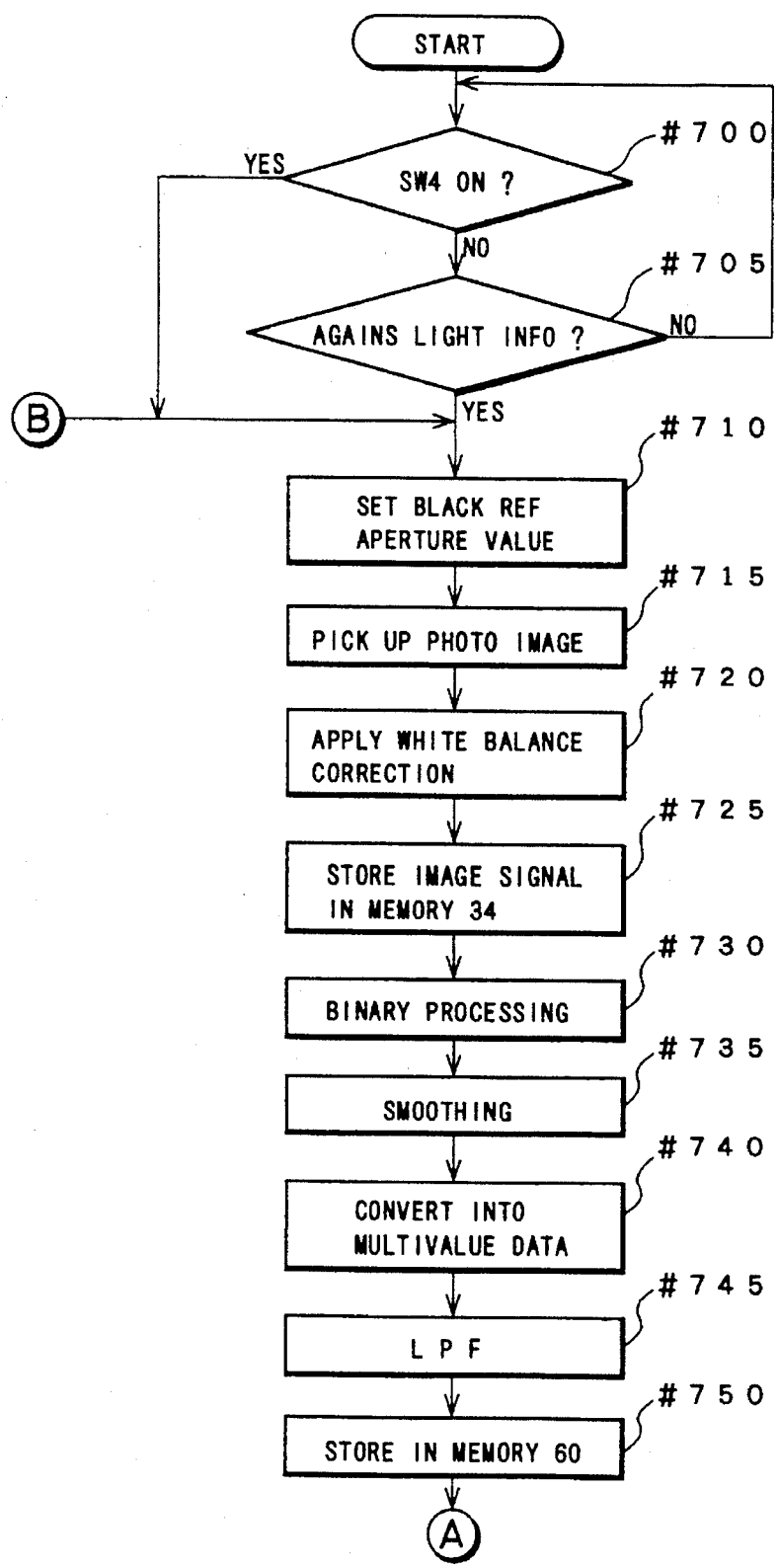
FIGS. 25A and 25B are flow charts showing an image quality correcting operation carried out in the fourth photographed image reproducing apparatus.
Figure 25B:
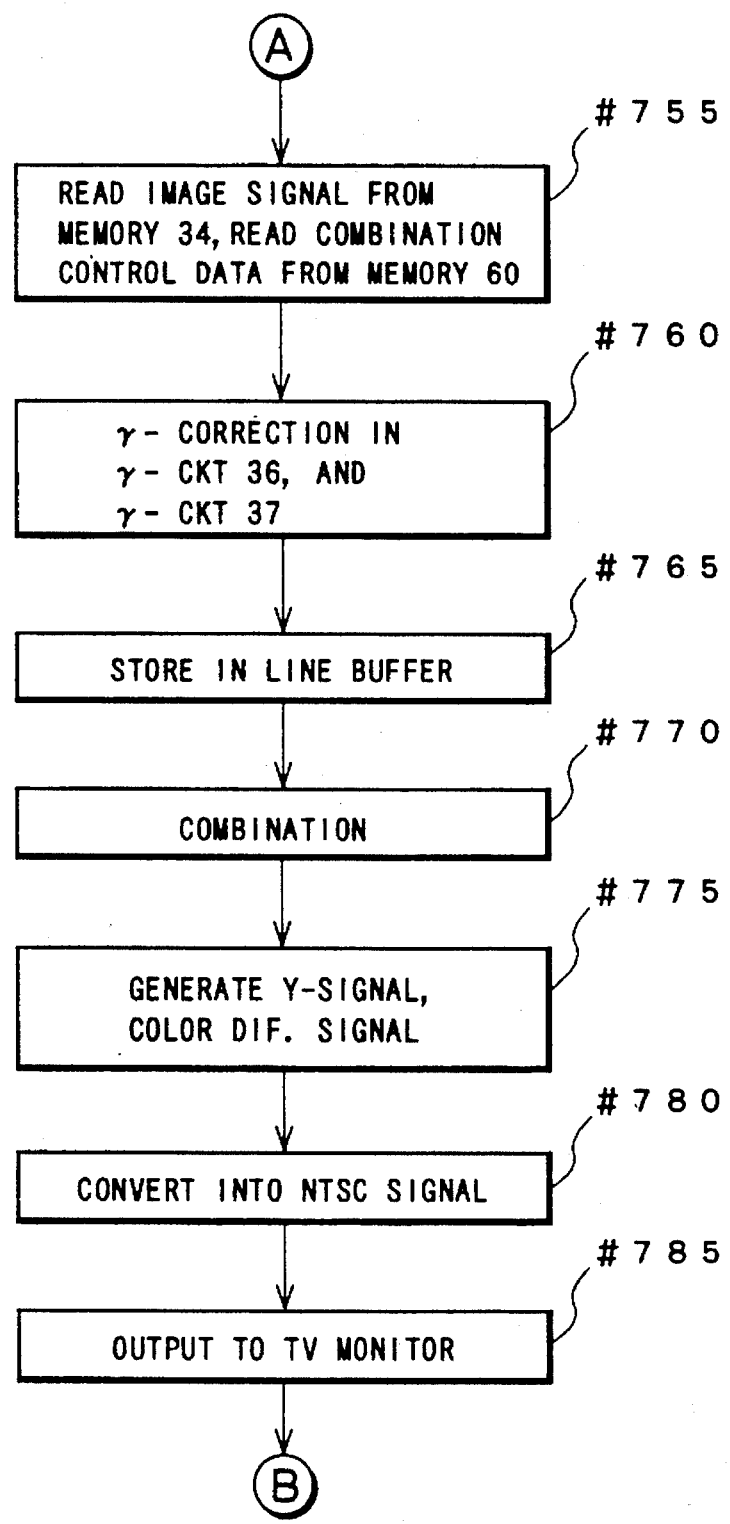

An image quality correcting operation of the fourth photographed image reproducing apparatus will be described with reference to flow charts shown in FIGS. 25A and 25B.

A CPU 30 performs the image quality correcting operation in a luminance balance correction mode when the switch SW4 is on (YES in Step #700) or photographing data include an against-the-light information (YES in Step #705). More specifically, the photographed image is picked up in accordance with a black reference exposure control value (Step #715); a specific signal processing is applied to the image signal (Step #720); and the image signal is stored in the memory unit 34 (Step #725).

The image signal stored in the memory 34 is immediately read to a Y-matrix circuit 41 and a specific binary processing is performed by the Y-matrix circuit 41 and the binary processing circuit 42 similarly to Steps #330, #335 in FIG. 4A (Step #730). Binary data generated in the binary processing circuit 42 are smoothed by the smoothing circuit 57 (Step #735) and are converted into multivalue data of n bits by the multivalue processing circuit 58 (Step #740).

The LPF 59 removes high frequency components of the multivalue data to thereby generate the combination control data having the sloped rise portion Q (Step #745) and this data is stored in the memory 60 (Step #750).

The image signal is read from the memory unit 34 to the gradation circuits 36, 37 and the combination control data is read from the memory 60 to the combination processing circuit 61 (Step #755). The image signal is converted using the gamma characteristic γ1 for low luminance in the gradation circuit 36 and is also converted using the gamma characteristic γ2 for high luminance in the gradation circuit 37 (Step #760). Thus converted image signals are stored in the line buffer 54 (Step #765).

The image signals stored in the line buffers 54 are read to the combination processing circuit 61 sequentially in accordance with a control signal from the address controller 48. These image signals are combined in the circuit 61 in accordance with the combination control data from the memory 60 (Step #770). The circuit 61 calculates the combining factors K, (1−K) from the combination control data and combines the low and high luminance area signal components in accordance with the equation 1.

The combined signal is input to the matrix circuit 38 in which a y-signal and color difference signals (R-Y), (B-Y) are generated (Step #775). Thus generated signals are converted into a NTSC signal by the encoder 39 (Step #780), and this NTSC signal is converted into an analog signal to be output to a TV monitor (Step #785).

After the image signal for one frame of image is reproduced, this routine returns to Step #710. Thereafter, the photographed image is picked up and is output to the TV monitor after the combination processing similar to the above is carried out. Photographed images are picked up in a specified cycle and the combined images obtained by applying the combination processing to the picked up images are reproduced one after another on the TV monitor.

In the fourth embodiment as well, the operator is allowed to adjust the high luminance area (or low luminance area) of the combined image manually by adjusting the variable resistor 471 while viewing the combined image reproduced on the TV monitor. If the filter characteristic of the LPF 59 is made manually adjustable, the gamma characteristic γ4 used for the boundary area becomes changeable and accordingly the density characteristic of the boundary portion of the combined image can be manually finely adjusted so that the reproduced image looks more naturally.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image reproducing apparatus for reproducing a photographed image recorded on a film, wherein the film carries a plurality of kinds of magnetically recorded photographic information about the photographed image, the apparatus comprising:

reproducing means for reproducing the photographed image recorded on the film;

reading means for reading the plurality of kinds of photographic information from the film;

determining means for determining the priority order of the plurality of kinds of photographic information; and setting means for setting a correction for the photographed image based on the priority order determined by the determining means.

2. An image reproducing apparatus according to claim 1 wherein:

the plurality of kinds of magnetically recorded photographic information includes focus information as to whether the subject of the photographed image is in focus or out of focus;

the correcting means includes means for correcting the outline of the photographed image, the outline correcting means having a plurality of correction levels;

the determining means places the focus information on the top rank of the priority order; and the setting means sets higher level outline correction when the subject of the photographed image is out of focus.

3. An image reproducing apparatus for reproducing a photographed image recorded on a film, wherein the film carries a plurality of kinds of magnetically recorded photographic information about the photographed image, the apparatus comprising:

reproducing means for reproducing the photographed image recorded on the film; the reproducing means having a plurality of reproduction manners corresponding to the kinds of photographic information;

reading means for reading the plurality of kinds of magnetically recorded photographic information from the film;

determining means for determining a priority order of the plurality of kinds of photographic information;

setting means includes means for setting the reproduction manner corresponding to the kind of photographic information ranked on the top priority; and control means for controlling the reproducing means to reproduce the photographed image in accordance with the set reproduction manner.

4. An image reproducing apparatus according to claim 3 wherein: the plurality of reproduction manners includes a reproduction manner of reproducing the photographed image while correcting the outline of the photographed image at a selectively settable correction level; and the setting means includes means for setting an outline correction level in accordance with the kind of photographic information ranked on the top priority.

5. An image reproducing apparatus according to claim 3 wherein:

the plurality of reproduction manners includes a reproduction manner of reproducing the photographed image while correcting the gradation of the photographed image at a selectively settable correction level; and the setting means includes means for setting a gradation correction level in accordance with the kind of magnetically recorded photographic information ranked on the top priority.

* * * * *